United States Patent
Tian et al.

(10) Patent No.: US 12,216,816 B2
(45) Date of Patent: Feb. 4, 2025

(54) WEARABLE DISPLAY DEVICE AND METHOD FOR DETERMINING GAZE POSITIONS

(71) Applicant: BOE Technology Group Co., Ltd., Beijing (CN)

(72) Inventors: Wenhao Tian, Beijing (CN); Lei Wang, Beijing (CN); Xuan Feng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/788,448

(22) PCT Filed: Jun. 18, 2021

(86) PCT No.: PCT/CN2021/100916
§ 371 (c)(1),
(2) Date: Jun. 23, 2022

(87) PCT Pub. No.: WO2022/261944
PCT Pub. Date: Dec. 22, 2022

(65) Prior Publication Data
US 2024/0168547 A1    May 23, 2024

(51) Int. Cl.
*G06F 3/01* (2006.01)
(52) U.S. Cl.
CPC ................................ *G06F 3/013* (2013.01)
(58) Field of Classification Search
CPC ....................................................... G06F 3/013
See application file for complete search history.

(56) References Cited

U.S. PATENT DOCUMENTS

| | | |
|---|---|---|
| 10,725,292 B2 | 7/2020 | Ollila |
| 2017/0277949 A1 | 9/2017 | Bae et al. |
| 2020/0110271 A1* | 4/2020 | Komogortsev ...... G02B 27/017 |
| 2021/0116995 A1 | 4/2021 | Li et al. |
| 2022/0155613 A1* | 5/2022 | Krener-Iversen .... H04N 13/302 |

FOREIGN PATENT DOCUMENTS

WO    2018154564 A1    8/2018

OTHER PUBLICATIONS

Extended European search report of counterpart European application No. 21945529.2 issued on Mar. 25, 2024.

* cited by examiner

*Primary Examiner* — Priyank J Shah
(74) *Attorney, Agent, or Firm* — Lippes Mathias LLP

(57) ABSTRACT

Provided is a wearable display module including a display panel, a plurality of light-emitting elements, a plurality of photoelectric sensor assemblies, and an optical structure. The display panel includes a display region and a peripheral region surrounding the display region. The light-emitting elements are configured to emit light to be irradiated to eyes of a user. The photoelectric sensor assemblies are disposed in the peripheral region, each of the photoelectric sensor assemblies being configured to receive optical signals reflected via the eyes of the user, and convert the optical signals into electric signals. The optical structure is disposed on a side of the photoelectric sensor assembly, and the optical structure includes a light shielding region and a plurality of light transmitting regions, wherein each of the light-transmitting regions at least is configured to transmit the optical signal to a photoelectric sensor assembly corresponding to the light transmitting regions.

19 Claims, 14 Drawing Sheets

WEARABLE DISPLAY DEVICE AND METHOD FOR DETERMINING GAZE POSITIONS

CROSS-REFERENCE TO RELATED APPLICATION

This application is a 371 of PCT application No. PCT/CN2021/100916, filed on Jun. 18, 2021, the content of which is herein incorporated by reference in its entirety.

TECHNICAL FIELD

The present disclosure relates to the field of virtual reality technologies, and in particular, relates to a wearable display device and a method for determining gaze positions.

BACKGROUND

A virtual reality (VR) device refers to a device that is capable of creating a virtual environment based on displayed images and exerting an immersive feeling for the user in the virtual environment.

SUMMARY

The present disclosure provides a wearable display device and a method for determining gaze positions. The technical solutions are as follows:

In one aspect, a wearable display device is provided. The wearable display device includes:
  a display panel, including a display region and a peripheral region surrounding the display region;
  a plurality of light-emitting elements, configured to emit light to be irradiated to eyes of a user;
  a plurality of photoelectric sensor assemblies, disposed in the peripheral region, wherein each of the photoelectric sensor assemblies is configured to receive optical signals, reflected via the eyes of the user, of the plurality of light-emitting elements, and convert the optical signals into electric signals, the electric signals being configured to determine a gaze position of the eyes of the user on the display panel; and
  an optical structure, disposed on a side, distal from the display panel, of the photoelectric sensor assembly, an orthographic projection of the optical structure on the display panel being within the peripheral region, and the optical structure includes a light shielding region and a plurality of light transmitting regions, wherein the plurality of light transmitting regions are in one-to-one correspondence to the plurality of photoelectric sensor assemblies, each of the light transmitting regions at least being configured to transmit the optical signal to a corresponding photoelectric sensor assembly.

Optionally, the peripheral region includes: a first region extending along a first direction and a second region extending along a second direction, the first direction being intersected with the second direction; and the plurality of photoelectric sensor assemblies include: a plurality of first photoelectric sensor assemblies and a plurality of second photoelectric sensor assemblies;
  wherein the plurality of first photoelectric sensor assemblies are disposed in the first region and arranged along the first direction, and the plurality of second photoelectric sensor assemblies are disposed in the second region and arranged along the second direction.

Optionally, the optical structure includes: a first branch structure extending along the first direction and a second branch structure extending along the second direction; wherein
  the first branch structure is provided with a plurality of first light transmitting regions in one-to-one correspondence to the plurality of first photoelectric sensor assemblies, an orthographic projection of each of the first light transmitting regions on the display panel being at least overlapped with an orthographic projection of a corresponding first photoelectric sensor assembly on the display panel; and
  the second branch structure is provided with a plurality of second light transmitting regions in one-to-one correspondence to the plurality of second photoelectric sensor assemblies, an orthographic projection of each of the second light transmitting regions on the display panel being at least overlapped with an orthographic projection of a corresponding second photoelectric sensor assembly on the display panel.

Optionally, the first direction is perpendicular to the second direction; and the peripheral region includes: two first regions and two second regions;
  wherein the two first regions are arranged along the second direction and respectively disposed on two sides of the display region, and the two second regions are arranged along the first direction and respectively disposed on the two sides of the display region.

Optionally, the optical structure includes: two first branch structures in one-to-one correspondence to the two first regions and two second branch structures in one-to-one correspondence to the two second regions.

Optionally, a detection width, along a target direction, of the photoelectric sensor assembly is positively correlated with a width, along the target direction, of the light transmitting region; and
  the detection width, along the target direction, of the photoelectric sensor assembly is positively correlated with a width, along the target direction, of the photoelectric sensor assembly;
  wherein the target direction is the first direction or the second direction.

Optionally, the detection width h, along the target direction, of the photoelectric sensor assembly satisfies:

$$h = 2u * \tan(\arcsin(\frac{n_1}{n_2} * \sin(\arctan(\frac{p+s}{2v})))) + s$$

wherein u represents a distance between the eyes of the user and the optical structure, v represents a distance between the optical structure and the plurality of photoelectric sensor assemblies, n1 represents a refractive index of a medium between the optical stricture and the plurality of photoelectric sensor assemblies, n2 represents a refractive index of a medium between the eyes of the user and the optical structure, p represents the width, along the target direction, of the photoelectric sensor assembly, and s represents the width, along the target direction, of the light transmitting region.

Optionally, each of the light transmitting regions is a circular through hole; or
  each of the light transmitting regions is a rectangular through hole.

Optionally, a first edge of each of the rectangular through holes is parallel to the first direction, and a second edge is parallel to the second direction; and the plurality of rectangular through holes include a plurality of first rectangular through holes and a plurality of second rectangular through holes;
  wherein the first rectangular through hole is disposed in the first region extending along the first direction in the peripheral region, a length of a first edge of the first rectangular through hole being less than a length of a second edge;
  wherein the second rectangular through hole is disposed in the second region extending along the second direction in the peripheral region, a length of a first edge of the second rectangular through hole being greater than a length of a second edge.

Optionally, the wearable display device further includes a light transmitting layer;
  wherein the light transmitting layer is disposed between the plurality of photoelectric sensor assemblies and the optical structure.

Optionally, the wearable display device further includes a filter;
  wherein the filter is disposed on a side, distal from the display panel, of the plurality of photoelectric sensor assemblies, an orthographic projection of the filter on the display panel being overlapped with orthographic projections of the plurality of photoelectric sensor assemblies on the display panel; wherein the filter is configured to transmit infrared light and absorb visible light.

Optionally, the wearable display device further includes: a lens and a lens frame;
  wherein the lens is disposed on a display side of the display panel, and the lens frame is disposed on an edge of the lens.

Optionally, the plurality of light-emitting elements are disposed on a side, distal from the display panel, of the lens frame, and connected to the lens frame.

Optionally, the plurality of light-emitting elements are arranged evenly on the side, distal from the display panel, of the lens frame.

Optionally, the light-emitting element is an infrared light-emitting diode.

Optionally, the wearable display device further includes: a first polarizer layer and a second polarizer layer;
  wherein the first polarizer layer is disposed on a light-exiting side of the light-emitting element, and the second polarizer layer is disposed on the side, distal from the display panel, of the plurality of photoelectric sensor assemblies, a polarization direction of the second polarizer layer being intersected with a polarization direction of the first polarizer layer.

Optionally, the polarization direction of the second polarizer layer is perpendicular to the polarization direction of the first polarizer layer.

In another aspect, a method for determining gaze positions is provided. The method is applicable to the wearable display device as described above. The method includes:
  receiving optical signals, reflected via eyes of a user, of a plurality of light-emitting elements;
  converting the optical signals into electric signals; and
  determining a gaze position of the eyes of the user on a display panel based on signal values of the electric signals and a position of at least one of the photoelectric sensor assemblies.

Optionally, determining the gaze position of the eyes of the user on the display panel based on the signal values of the electric signals and the position of the at least one of the photoelectric sensor assemblies includes:
  determining at least one target first photoelectric sensor assembly from a plurality of first photoelectric sensor assemblies arranged along a first direction;
  determining at least one target second photoelectric sensor assembly from a plurality of second photoelectric sensor assemblies arranged along a second direction; and
  determining the gaze position of the eyes of the user on the display panel based on a position of each of the at least one target first photoelectric sensor assembly and a position of each of the at least one target second photoelectric sensor assembly;
  wherein a signal value of an electric signal transmitted by the target first photoelectric sensor assembly is less than or equal to a first threshold, and a signal value of an electric signal transmitted by the target second photoelectric sensor assembly is less than or equal to a second threshold.

In still another aspect, a non-transitory computer-readable storage medium is provided. The non-transitory computer-readable storage medium stores one or more instructions therein, wherein the one or more instructions, when loaded and executed by a display device, cause the display device to perform the method as described above.

In yet still another aspect, a computer program product storing one or more instructions therein is provided, wherein the computer program product, when loaded and run on a computer, causes the computer to perform the method as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, a VR device includes a display panel, a camera, a processor, and a drive circuit. The camera is configured to capture an eye image of the user. The processor is configured to determine a gaze position of the user on the display panel according to the eye image, and partially render the image to be displayed according to the gaze position. The drive circuit is configured to drive, based on a received partially rendered display image, the display panel display. Because the processor may only partially render the region of a gaze point in the display image and does not need to globally render the to-be-displayed image, not only a load of the processor may be reduced, but also a display effect of the display panel may be ensured.

However, in the related art, the processor has a low efficiency in determining the gaze position according to the eyes image taken by the camera, thereby resulting in a lower display efficiency of the display panel.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

Figure 1:
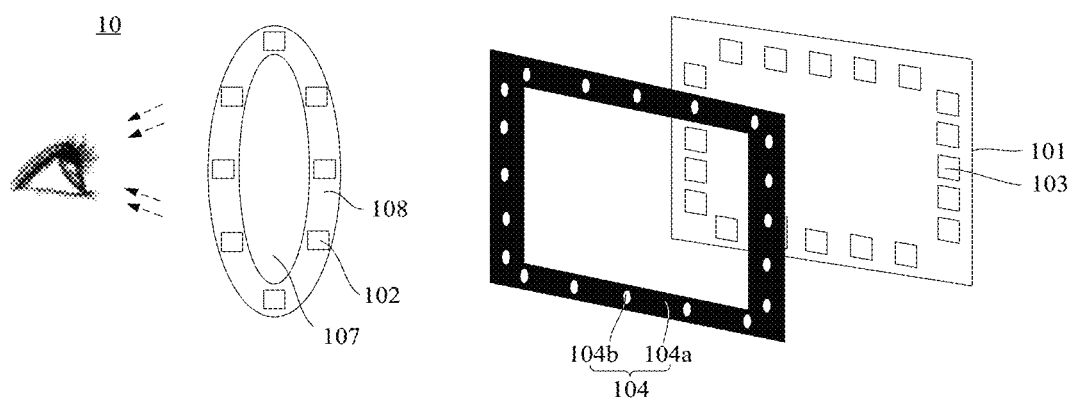
FIG. 1 is a schematic structural diagram of a wearable display device according to an embodiment of the present disclosure.

FIG. 1 is a schematic structural diagram of a wearable display device according to an embodiment of the present disclosure. As illustrated in FIG. 1, the wearable display device 10 may include: a display panel 101, a plurality of light-emitting elements 102, a plurality of photoelectric sensor assemblies 103, and an optical structure 104.

Light emitted by the plurality of light-emitting elements 102 is configured to be irradiated to eyes of a user, and the eyes of the user may reflect the light emitted by the plurality of light-emitting elements 102. In this way, each of the photoelectric sensor assemblies 103 is configured to receive an optical signal, reflected via the eyes of the user, of each of the light-emitting elements 102, and convert the optical signal into an electric signal. The electric signal is configured to determine a gaze position of the eyes of the user on the display panel 101.

In general, an amount of data of the electric signals is small, and the amount of data of images is large. Therefore, an efficiency of the wearable display device 10 in processing the electric signals is higher than an efficiency of the wearable device 10 in processing the images. In the embodiments of the present disclosure, the wearable display device 10 has a high efficiency in processing an electric signal transmitted by each of the photoelectric sensor assemblies 103, such that the gaze position of the eyes of the user on display panel 101 is quickly determined. In this way, an efficiency of displaying images by the display panel 101 is improved, and thus a higher refresh rate of the display panel is achieved.

Figure 2:
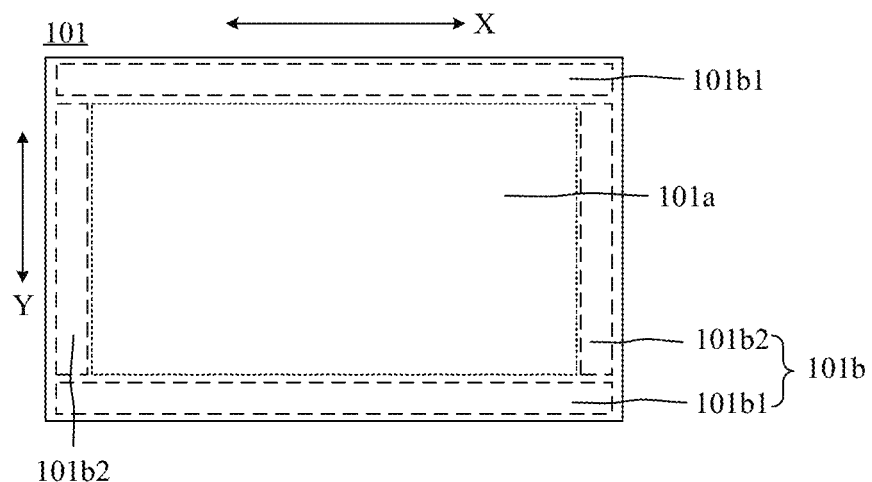
FIG. 2 is a top view of a display panel according to an embodiment of the present disclosure.

FIG. 2 is a top view of a display panel according to an embodiment of the present disclosure. As illustrated in FIG. 2, the display panel 101 may include a display region 101a and a peripheral region 101b surrounding the display region 101a. The plurality of photoelectric sensor assemblies 103 are disposed in the peripheral region 101b. The plurality of photoelectric sensor assemblies 103 may not affect a normal display of the display panel 101, and a display effect of display panel 101 is better.

Referring to FIG. 1 and FIG. 2 together, the optical structure 104 is disposed on a side, distal from the display panel 101, of the photoelectric sensor assembly 103. An orthographic projection of the optical structure 104 on the display panel 101 is within the peripheral region 101b. The optical structure 103 includes a light shielding region 104a and a plurality of light transmitting regions 104b. The plurality of light transmitting regions 104b are in one-to-one correspondence to the plurality of photoelectric sensor assemblies 103, and each of the light transmitting regions 104*b* is at least configured to transmit the optical signal to a corresponding photoelectric sensor assembly 103.

Optionally, each of the light transmitting regions 104*b* may only transmit the optical signal to the corresponding photoelectric sensor assembly 103. Alternatively, each of the light transmitting regions 104*b* may also transmit the optical signal to photoelectric sensor assemblies 103 which are adjacent to the photoelectric sensor assembly corresponding to the light transmitting region 104*b* in addition to transmitting the optical signal to the corresponding photoelectric sensor assembly 103. Moreover, the optical signal transmitted to the corresponding photoelectric sensor assembly 103 by the light transmitting region 104*b* may be strong, and the optical signal transmitted to the adjacent photoelectric sensor assemblies 103 may be weak.

Because the orthographic projection of the optical structure 104 on the display panel 101 is within the peripheral region 101*b*, a normal display of the display region 101*a* of the display panel 101 is not affected by the optical structure 104. Moreover, because the optical structure 104 may be divided into the light shielding region 104*a* and the plurality of light transmitting regions 104*b*, and each of the light transmitting regions 104*b* is at least configured to transmit the optical signal to the corresponding photoelectric sensor assembly 103, regions of the eyes of the user corresponding to the optical signals received by different photoelectric sensor assemblies 103 are different. In this way, the wearable display device 10 may determine the gaze position based on electric signals converted from optical signals reflected via different regions of the eyes of the user.

In summary, the embodiments of the present disclosure provide a wearable display device. Because the wearable display device has a high efficiency in processing the electric signal transmitted by each of the photoelectric sensor assemblies, the wearable display device may quickly determine the gaze position of the eyes of the user on the display panel based on the electric signal transmitted by each of photoelectric sensor assemblies. In this way, the efficiency of displaying the images by the display panel is improved, and thus a higher refresh rate of the display panel is achieved.

Optionally, the light-emitting element 102 may be an infrared light-emitting diode. Because reflectivities of a pupil, a sclera, and an iris of the eye of the user against infrared light are greatly different (e.g., a reflectivity of the pupil is from 3% to 5%, a reflectivity of the sclera is from 70% to 80%, and a reflectivity of the iris is from 10% to 20%), by designing the light-emitting element 102 as the infrared light-emitting diode, an optical signal, reflected via the pupil, of the infrared light, an optical signal, reflected via the sclera, of the infrared light, and an optical signal, reflected via the iris, of the infrared light that are received by the photoelectric sensor assembly 103 are greatly different. In this way, it is convenient for a processor of the wearable display device 10 to determine the gaze position of the eyes (the pupils) of the user on the display panel 101. Exemplarily, a wavelength of the light emitted by the light-emitting element 102 may range from 850 nm (nanometer) to 940 nm.

As illustrated in FIG. 2, the peripheral region 101*b* of the display panel 101 includes: a first region 101*b*1 extending along a first direction X and a second region 101*b*2 extending along a second direction Y. The first direction X is intersected with the second direction Y.

Figure 3:
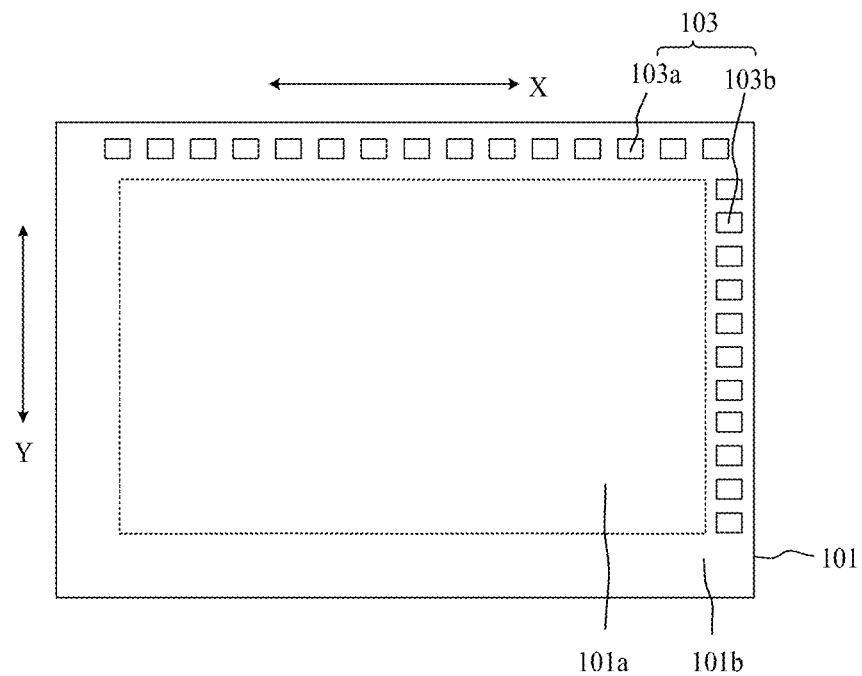
FIG. 3 is a schematic diagram of a display panel and a photoelectric sensor assembly according to an embodiment of the present disclosure.

Referring to FIG. 2 and FIG. 3 together, the plurality of photoelectric sensor assemblies 103 may include a plurality of first photoelectric sensor assemblies 103*a* and a plurality of second photoelectric sensor assemblies 103*b*. The plurality of first photoelectric sensor assemblies 103*a* are disposed in the first region 101*b*1 and arranged along the first direction X. The plurality of second photoelectric sensor assemblies 104*b* are disposed in the second region 101*b*2 and arranged along the second direction Y.

Optionally, the plurality of first photoelectric sensor assemblies 103*a* are arranged evenly along the first direction X, and the plurality of second photoelectric sensor assemblies 103*b* are arranged evenly along the second direction Y.

Figure 4:
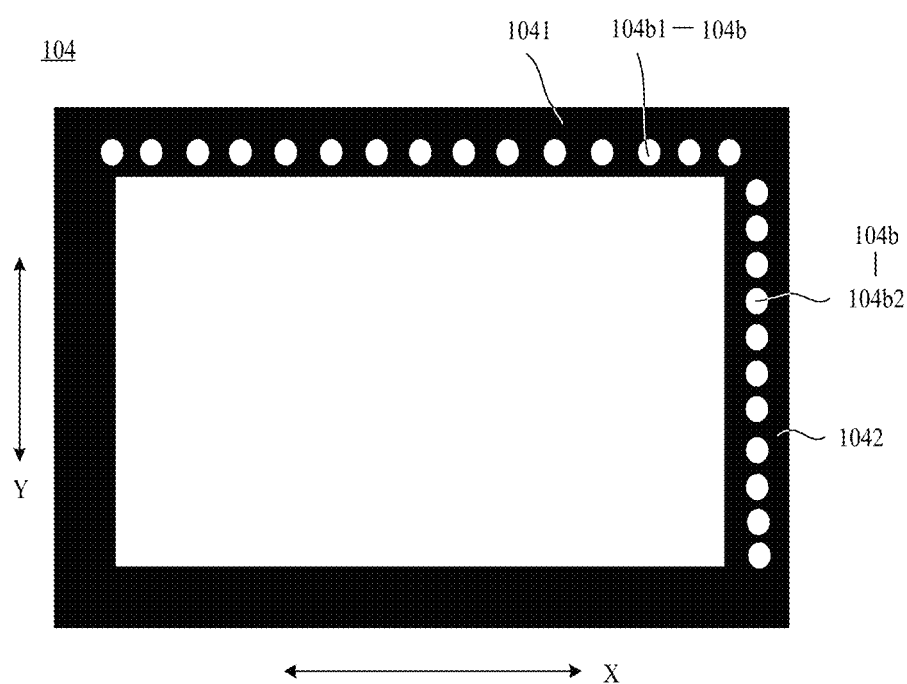
FIG. 4 is schematic structural diagram of an optical structure according to an embodiment of the present disclosure.

Referring to FIG. 2 and FIG. 4 together, the optical structure 104 may include a first branch structure 1041 extending along the first direction X and a second branch structure 1042 extending along the second direction Y.

The first branch structure 1041 is provided with a plurality of first light transmitting regions 104*b*1 in one-to-one correspondence to the plurality of first photoelectric sensor assemblies 103*a*. An orthographic projection of each of the first light transmitting regions 104*b*1 on the display panel 101 is at least overlapped with an orthographic projection of a corresponding first photoelectric sensor assembly 103*a* on the display panel 101. In this way, the first light transmitting region 104*b*1 may transmit the optical signal to the corresponding first photoelectric sensor assembly 103*a*.

The second branch structure 1042 is provided with a plurality of second light transmitting regions 104*b*2 in one-to-one correspondence to the plurality of second photoelectric sensor assemblies 103*b*. An orthographic projection of each of the second light transmitting regions 104*b*2 on the display panel 101 is at least overlapped with an orthographic projection of a corresponding second photoelectric sensor assembly 103*b* on the display panel 101. In this way, the second light transmitting region 104*b*2 may transmit the optical signal to the corresponding second photoelectric sensor assembly 103*b*.

In the embodiments of the present disclosure, the processor included in the wearable display device 10 may receive an electric signal transmitted by each first photoelectric sensor assembly 103*a* in the plurality of first photoelectric sensor assemblies 103*a*, and may determine at least one target first photoelectric sensor assembly from the plurality of first photoelectric sensor assemblies 103*a*. The processor may also receive an electric signal transmitted by each second photoelectric sensor assembly 103*b* in the plurality of second photoelectric sensor assemblies 103*b*, and may determine at least one target second photoelectric sensor assembly from the plurality of second photoelectric sensor assemblies 103*b*. Finally, the processor may determine the gaze position of the eyes of the user on the display panel 101 based on a position of the at least one target first photoelectric sensor assembly and a position of the at least one target second photoelectric sensor assembly.

A signal value of an electric signal transmitted by the target first photoelectric sensor assembly may be less than or equal to a first threshold, and a signal value of an electric signal transmitted by the target second photoelectric sensor assembly may be less than or equal to a second threshold. The first threshold and the second threshold may be equal, or not, which is not limited herein.

Because reflectivities of different regions of the eyes of the user against the light emitted by the light-emitting element 102 are different, optical signals, collected by the first photoelectric sensor assemblies 103*a* at different positions and the second photoelectric assemblies 103*b* at different positions, are different. Due to a deepest color of the pupil, a signal value of an optical signal reflected via the pupil is minimum. Furthermore, a signal value of an electric signal converted from the optical signal reflected via the pupil is minimum. The signal value of the optical signal indicates an intensity of the light.

Optionally, the processor may pre-store positions of the first photoelectric sensor assemblies 013a and positions of the second photoelectric sensor assemblies 103b. For any photoelectric sensor assembly 103 in the first photoelectric sensor assemblies 103a and the second photoelectric sensor assemblies 103b, the position, stored in the processor, of the photoelectric sensor assembly 103 may refer to coordinate values of the photoelectric sensor assembly 013 in a two-dimensional coordinate system. The two-dimensional coordinate system may refer to a coordinate system based on a plane where the display panel 101 is disposed.

Figure 5:
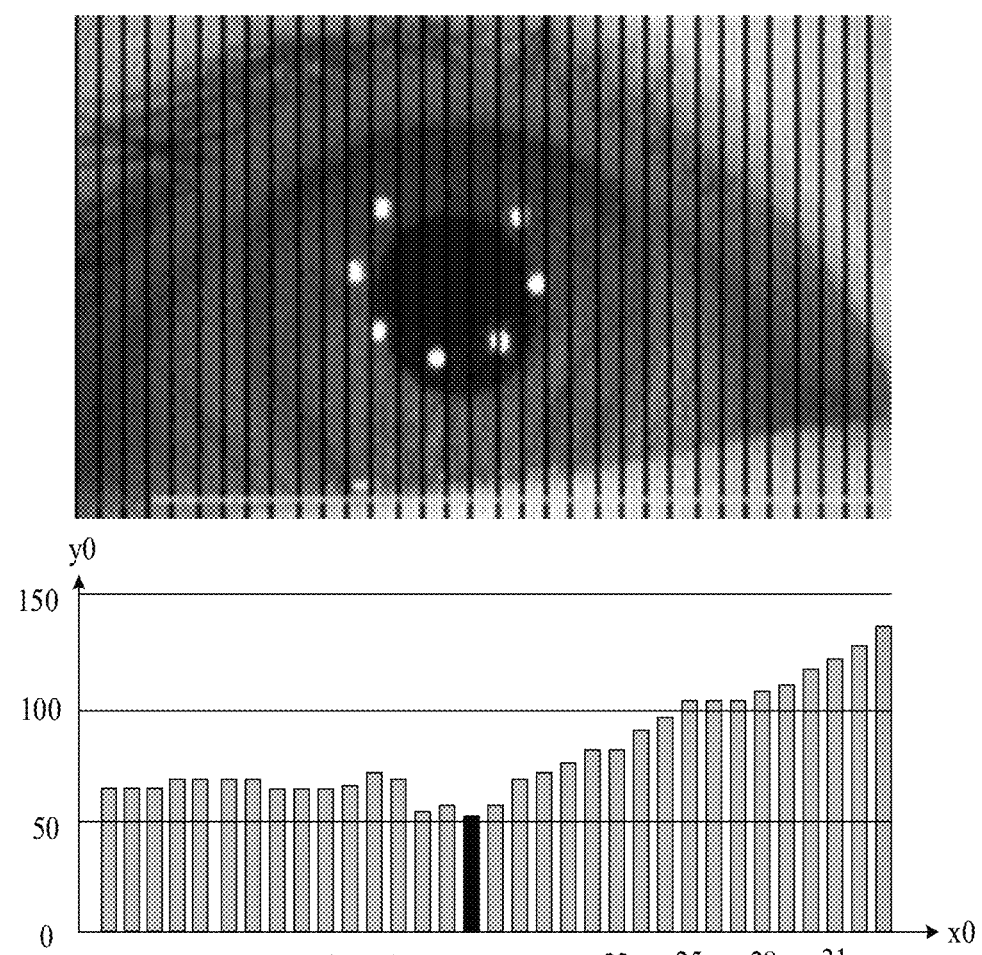
FIG. 5 is a schematic diagram of signal values of optical signals, reflected via different regions of eyes of a user, received by a plurality of first photoelectric sensor assemblies according to an embodiment of the present disclosure.
Figure 6:
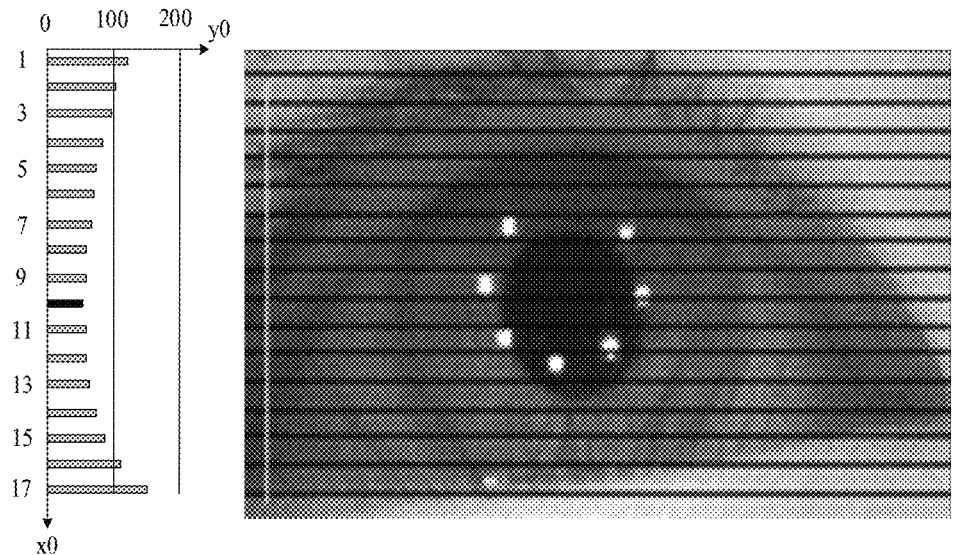
FIG. 6 is a schematic diagram of signal values of optical signals, reflected via different regions of eyes of a user, received by a plurality of second photoelectric sensor assemblies according to an embodiment of the present disclosure.

Exemplarily, FIG. 5 shows that signal values, collected by each of the first photoelectric sensor assemblies 103a, of the optical signals reflected via different regions of the eyes of the user. FIG. 6 shows signal values, collected by each of the second photoelectric sensor assemblies 103b, of the optical signals reflected via different regions of the eyes of the user. In FIG. 5 and FIG. 6, an abscissa x0 refers to a position where each of the photoelectric sensor assemblies 103 is disposed, and an ordinate y0 refers to a signal value of the received electric signal. In conjunction with FIG. 5 and FIG. 6, due to the deepest color of the pupil, the optical signal reflected via the pupil is minimum. Correspondingly, the signal value of the electric signal converted from the optical signal reflected via the pupil is minimum. Therefore, in the embodiments of the present disclosure, the processor may reliably determine the gaze position of the eye of the user on the display panel 101, based on a position of a target first photoelectric sensor assembly transmitting an electric signal with a small signal value and a position of a target second photoelectric sensor assembly transmitting an electric signal with a small signal value.

In the embodiments of the present disclosure, the first threshold and the second threshold may be fixed values pre-stored in the processor. Alternatively, the first threshold may be determined, by the processor, based on the received signal values of the electric signals of the plurality of first photoelectric sensor assemblies 103a. The second threshold may be determined, by the processor, based on the received signal values of the electric signals of the plurality of second photoelectric sensor assemblies 103b.

Exemplarily, the processor may rank signal values of N electric signals transmitted by N first photoelectric sensor assemblies 103a in an ascending order, and determine a signal value in the $n^{th}$ position as the first threshold. N is an integer greater than 1 and n is an integer greater than 1 and less than N/2. The processor may rank signal values of M electric signals transmitted by M second photoelectric sensor assemblies 103b in the ascending order, and determine a signal value in the $m^{th}$ position as the second threshold. M is an integer greater than 1 and n is an integer greater than 1 and less than M/2.

Alternatively, the processor determines a minimum of signal values of the received electric signals of the plurality of first photoelectric sensor assemblies 103a as the first threshold, and determines a minimum of signal values of the received electric signals of the plurality of second photoelectric sensor assemblies 103b as the second threshold.

In the embodiments of the present disclosure, the processor may determine first coordinate values of a target first photoelectric sensor assembly, transmitting an electric signal with a minimum signal value, in the plurality of first photoelectric sensor assemblies 103a, and may determine second coordinate values of a target second photoelectric sensor assembly, transmitting an electric signal with a minimal signal value, in the plurality of second photoelectric sensor assemblies 103b. The processor may determine the gaze position of the eyes of the user on the display panel 101 based on the first coordinate values and the second coordinate values.

As illustrated in FIG. 2, the first direction X is perpendicular to the second direction Y. The first direction X may be a pixel row direction of the display panel 101, and the second direction Y may be a pixel column direction of the display panel 101.

Figure 7:
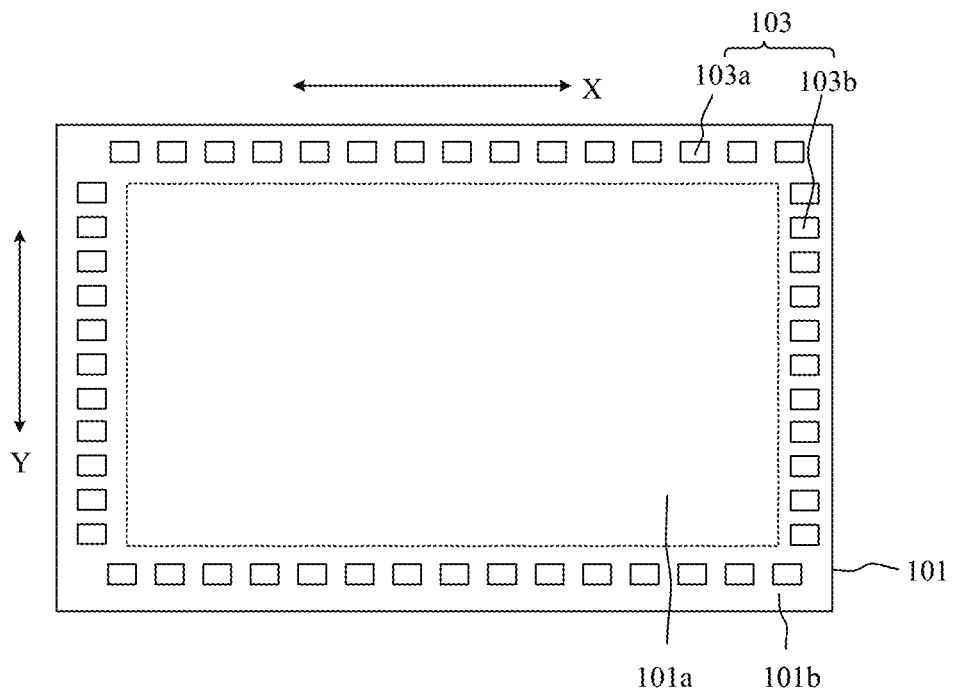
FIG. 7 is a schematic diagram of another display panel and a photoelectric sensor assembly according to an embodiment of the present disclosure.
Figure 8:
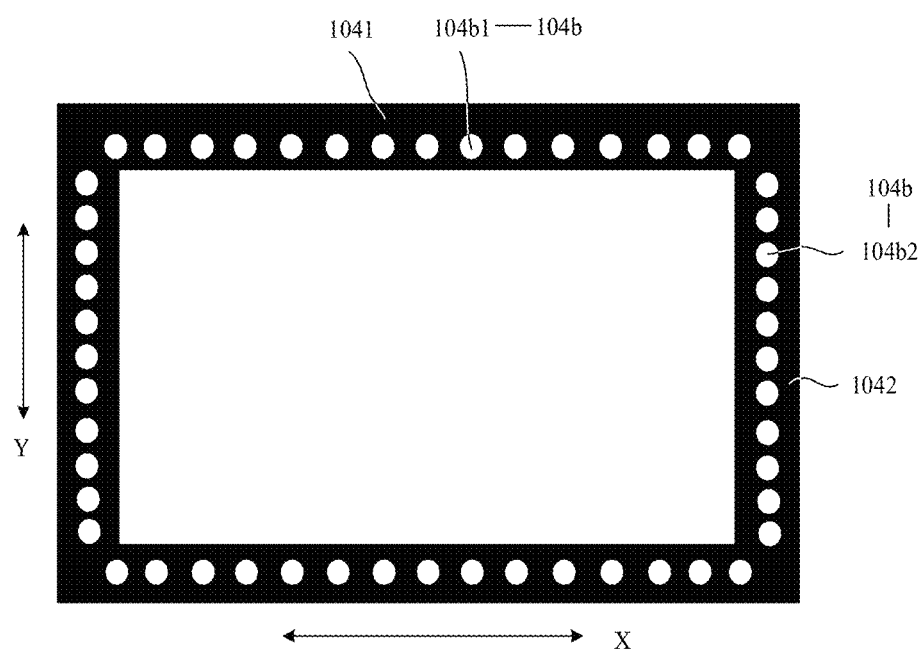
FIG. 8 is a schematic structural diagram of another optical structure according to an embodiment of the present disclosure.

As illustrated in FIG. 2, the peripheral region 101b may include two first regions 101b1 and two second regions 101b2. The two first regions 101b1 may be arranged along the second direction Y and respectively disposed on two sides of the display region 101a. The two second regions 101b2 may be arranged along the first direction X and respectively disposed on the two sides of the display region 101a. Accordingly, as illustrated in FIG. 7, in the plurality of first photoelectric sensor assemblies 103a of the plurality of the photoelectric sensor assemblies 103, one portion of the first photoelectric sensor assemblies 103a are disposed in one of the first regions 101b1, and the other portion of the first photoelectric sensor assemblies 104a are disposed in the other of the first regions 101b1. In the plurality of second photoelectric sensor assemblies 103b of the plurality of the photoelectric sensor assemblies 103, one portion of the second photoelectric sensor assemblies 103b are disposed in one of the second regions 101b2, and the other portion of the second photoelectric sensor assemblies 103b are disposed in the other of the second regions 101b2. In addition, as illustrated in FIG. 8, the optical structure 104 includes: two first branch structures 1041 in one-to-one correspondence to the two first regions 101b1 and two second branch structures 1042 in one-to-one correspondence to the two second regions 101b2.

In this way, the processor may determine the gaze position of the eyes of the user on the display panel 101 based on the first photoelectric sensor assemblies 103a in the two first regions 101b1 and the second photoelectric sensor assemblies 103b in the two second regions 101b2, thereby improving an accuracy of the determined gaze position.

In the embodiments of the present disclosure, a detection width, along a target direction, of the photoelectric sensor assembly 103 is positively correlated with a width, along the target direction, of the light transmitting region 104b. That is, the larger the width, along the target direction, of the light transmitting region 104b, the larger the detection width, along the target direction, of the photoelectric sensor assembly 103; and the smaller the width, along the target direction, of the light transmitting region 104b, the smaller the detection width, along the target direction, of the photoelectric sensor assembly 103.

In addition, the detection width, along the target direction, of the photoelectric sensor assembly 103 is positively correlated with a width, along the target direction, of the photoelectric sensor assembly 103. That is, the larger the width, along the target direction, of the photoelectric sensor assembly 103, the larger the detection width, along the target direction, of the photoelectric sensor assembly 103; and the smaller the width, along the target direction, of the photoelectric sensor assembly 103, the smaller the detection width, along the target direction, of the photoelectric sensor assembly 103.

The detection width, along the target direction, of the photoelectric sensor assembly 103 may refer to a width of a region of the eyes of the user corresponding to an optical signal that is detected by the photoelectric sensor assembly 103. That is, an optical signal, reflected via a region, a width of which along the target direction is the detection width, of the eyes of the user, may be determined by the photoelectric sensor assembly 103. The target direction may be the first direction X or the second direction Y.

Optionally, the detection width h, along the target direction, of the photoelectric sensor assembly 103 satisfies:

$$h = 2u * \tan(\arcsin(\frac{n_1}{n_2} * \sin(\arctan(\frac{p+s}{2v})))) + s \qquad \text{formula (1)}$$

Figure 9:
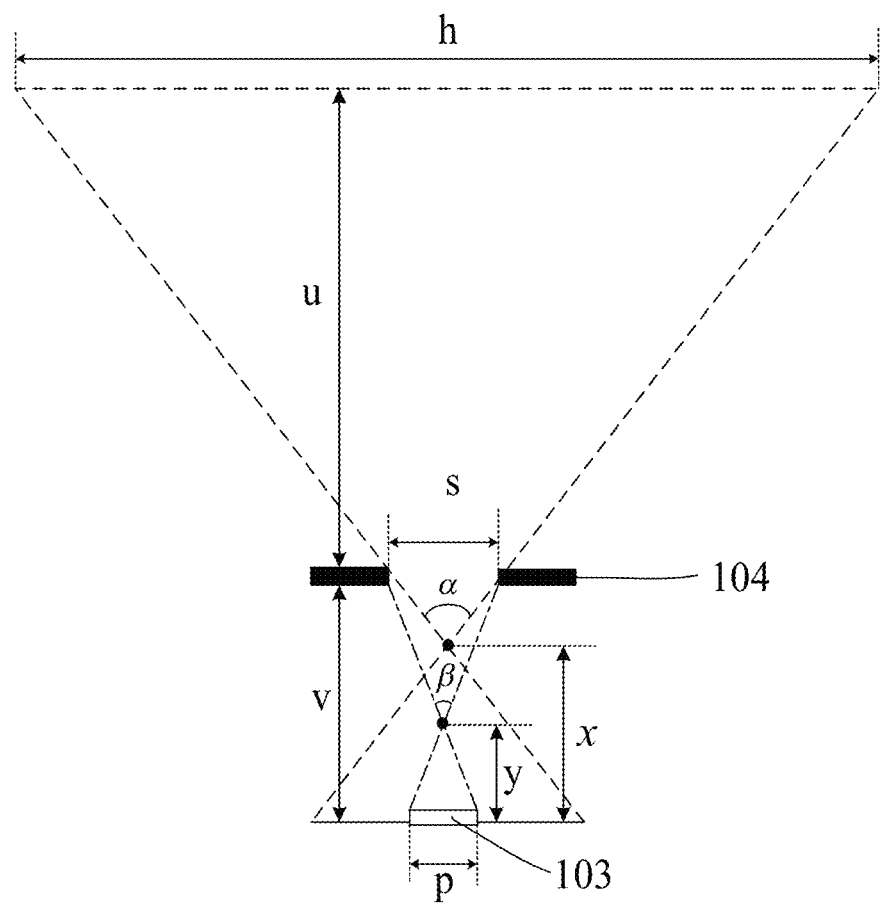
FIG. 9 is a schematic diagram of a detection width, along a target direction, of a photoelectric sensor assembly according to an embodiment of the present disclosure.

As illustrated in FIG. 9, u represents a distance between the eyes of the user and the optical structure 104, v represents a distance between the optical structure 104 and the plurality of photoelectric sensor assemblies 103, n1 represents a refractive index of a medium between the optical structure 104 and the plurality of photoelectric sensor assemblies 103, n2 represents a refractive index of a medium between the eyes of the user and optical structure 104, p represents the width, along the target direction, of the photoelectric sensor assembly 103, and s represents the width, along the target direction, of the light transmitting region 104b.

In the embodiments of the present disclosure, formula (1) may be derived from the following process.

As illustrated in FIG. 9, an included angle between two first connect lines is a (the included angel α may be referred to as a light receiving angle), wherein the two first connect lines respectively connect two sides of the detection region of the photoelectric sensor assembly 103 to the light transmitting regions 104b of the optical structure 104. An included angle between two second connect lines is β, wherein the two second connect lines respectively connect two sides of the light transmitting regions 104b of the optical structure 104 to two sides of the photoelectric sensor assembly 103. The two second connect lines may be lines of refract light in the case that light of the two first connect lines is incident from the light transmitting region 104b.

Assuming that a distance between an intersection of the two first connect lines and the photoelectric sensor assembly 103 is x, then referring to FIG. 9, $$\tan\frac{\alpha}{2} = \frac{h/2}{u+(v-x)} \qquad \text{formula (2)}$$

According to formula (2), $$h = 2*\tan\left(\frac{\alpha}{2}\right)*u + 2\tan\left(\frac{\alpha}{2}\right)*(v-x) \qquad \text{formula (3)}$$

According to the refraction law, $$\frac{\alpha}{2} = \arcsin(\frac{n1}{n2}*\sin(\frac{\beta}{2})) \qquad \text{formula (4)}$$

Assuming that a distance between an intersection of the two second connect lines and the photoelectric sensor assembly 103 is x, then referring to FIG. 9, $$\tan\frac{\beta}{2} = \frac{p/2}{y} \qquad \text{formula (5)}$$

According to the triangle similarity $$\frac{s}{p} = \frac{v-y}{y} \qquad \text{formula (6)}$$

According to formula (5) and formula (6), $$\frac{\beta}{2} = \arctan(\frac{s+p}{2v}) \qquad \text{formula (7)}$$

According to FIG. 9, $$\tan\frac{\alpha}{2} = \frac{s/2}{v-x} \qquad \text{formula (8)}$$

In the case that formula (7) is substituted into formula (4), $$\frac{\alpha}{2}$$

may be obtained, and then the obtained $$\frac{\alpha}{2}$$

is substituted into the $$2*\tan\left(\frac{\alpha}{2}\right)*u$$

in formula (3). Afterwards, formula (8) is substituted into $$2\tan\left(\frac{\alpha}{2}\right)*(v-x)$$

in formula (3). In this way, formula (1) may be derived.

Optionally, the detection width h, along the target direction, of the photoelectric sensor assembly 103 is correlated with an accuracy of determining the gaze position by the wearable display device 10. The larger the detection width h, along the target direction, of the photoelectric sensor assembly 103, the smaller the accuracy of determining the gaze position by the wearable display device 10; and the smaller the detection width h, along the target direction, of the photoelectric sensor assembly 103, the larger the accuracy of determining the gaze position by the wearable display device 10.

Before designing the wearable display device 10, an appropriate width p, along the target direction, of the photoelectric sensor assembly 103 and an appropriate width s, along the target direction, of the light transmitting region 103b may be determined to obtain an appropriate detection width h, along the target direction, of the photoelectric sensor assembly 103. In this way, the accuracy of determining the gaze position by the wearable display device 10 may meet an accuracy requirement.

Figure 10:
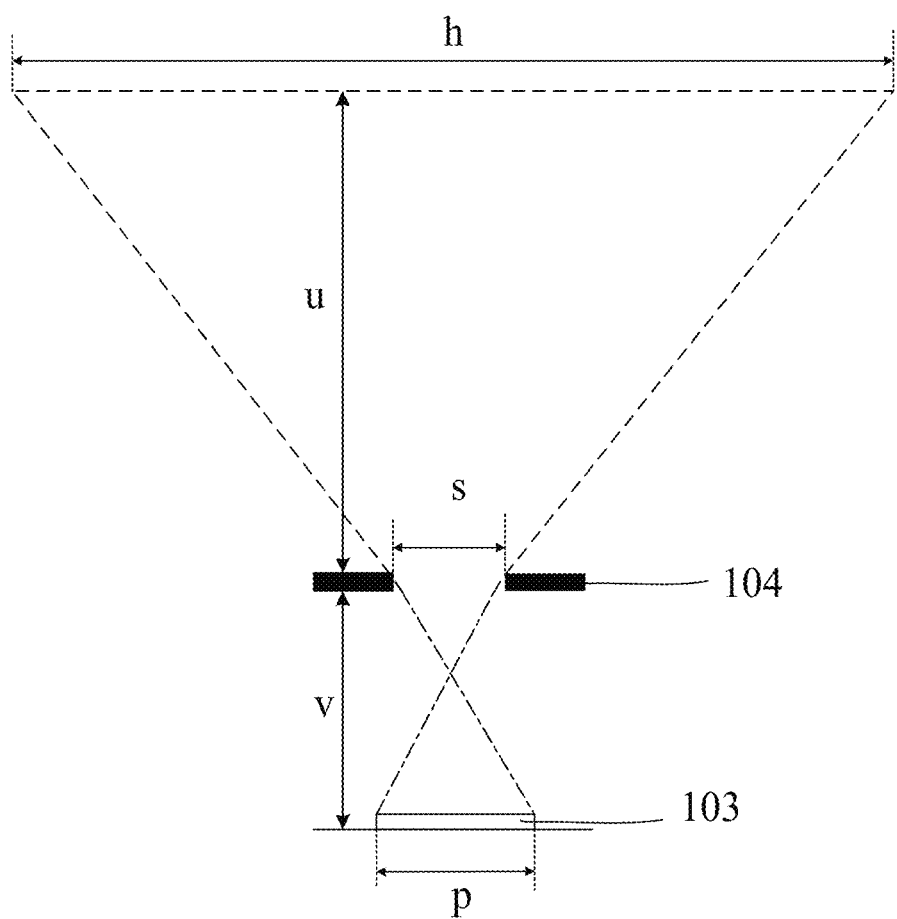
FIG. 10 is a schematic diagram of another detection width, along a target direction, of a photoelectric sensor assembly according to an embodiment of the present disclosure.
Figure 11:
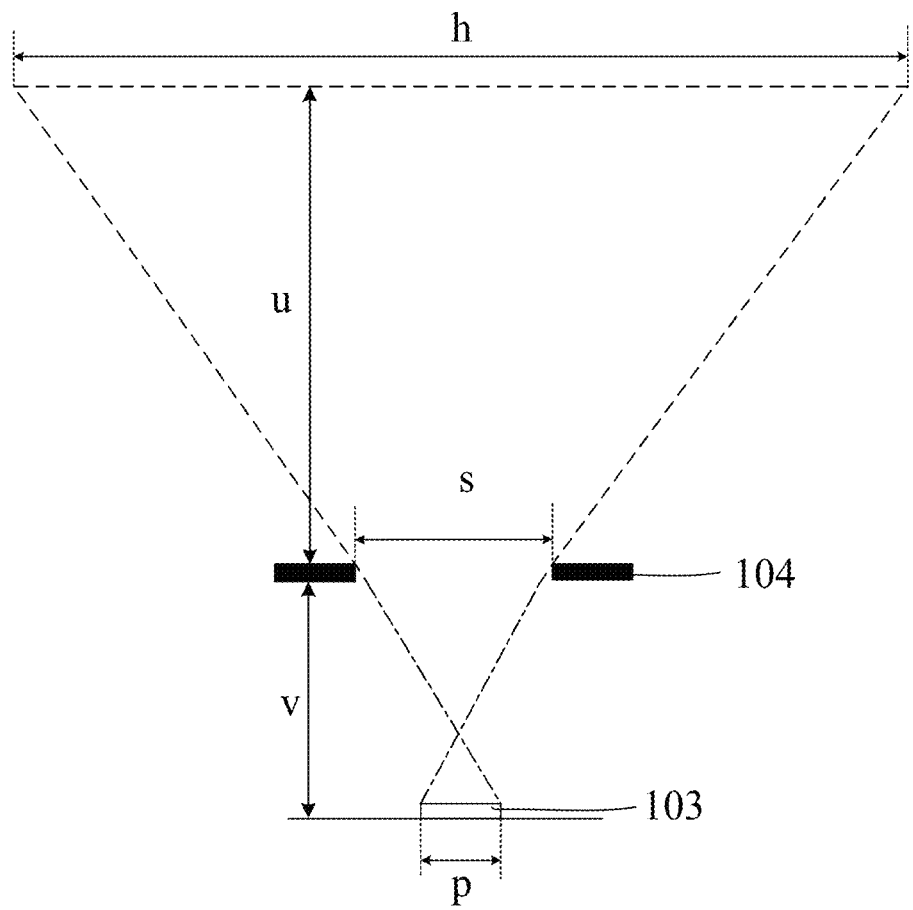
FIG. 11 is a schematic diagram of still another detection width, along a target direction, of a photoelectric sensor assembly according to an embodiment of the present disclosure.

Exemplarily, referring to FIG. 10 and FIG. 11 together, the width s, along the target direction, of the light transmitting region 104b in FIG. 11 is enlarged relative to that in FIG. 10. The width p, along the target direction, of the photoelectric assembly 103 in FIG. 11 may be less than the width p, along the target direction, of the photoelectric assembly 103 in FIG. 10, such that the detection width d, along the target direction, of the photoelectric sensor assembly 103 in FIG. 11 is equal to the detection width, along the target direction, of the photoelectric sensor assembly 103 in FIG. 10.

Figure 12:
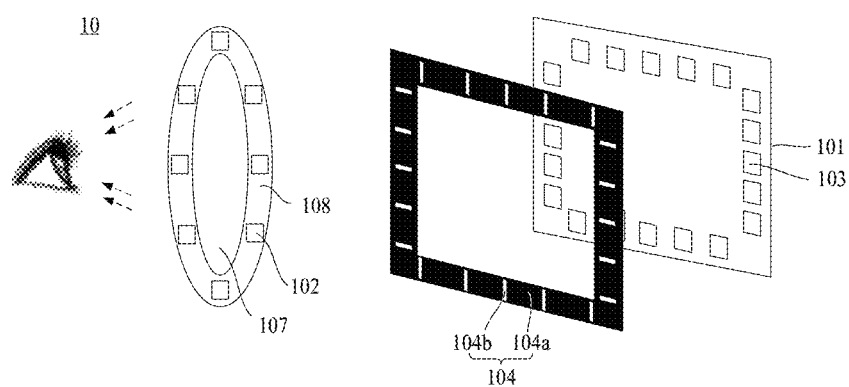
FIG. 12 is a schematic structural diagram of another wearable display device according to an embodiment of the present disclosure.
Figure 13:
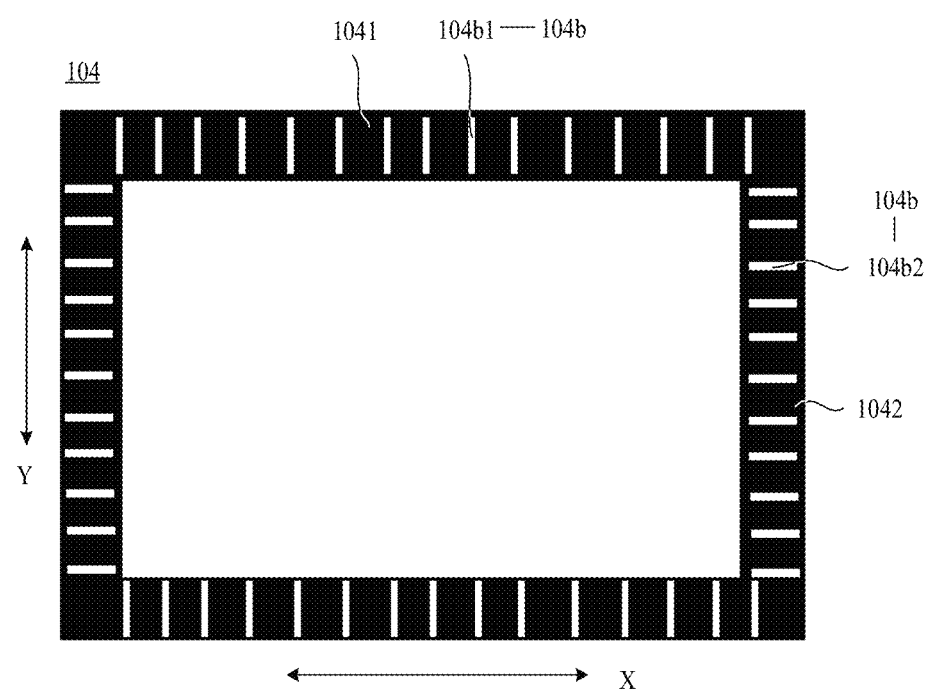
FIG. 13 is a schematic structural diagram of still another optical structure according to an embodiment of the present disclosure.

In the embodiments of the present disclosure, as illustrated in FIG. 4 and FIG. 8, each of the light transmitting regions 104b is a circular through hole. Alternatively, as illustrated in FIG. 12 and FIG. 13, each of the light transmitting regions 104b is a rectangular through hole. The rectangular through hole may be a slit.

As illustrated in FIG. 13, a first edge of each rectangular through hole in the plurality of rectangular through holes 104b is parallel to the first direction X, and a second edge is parallel to the second direction Y. The plurality of rectangular through holes 104b include: a plurality of first rectangular through holes 104b1 and a plurality of second rectangular through holes 104b2. The first rectangular through hole 104b1 is disposed in the first region 101b1 extending along the first direction X in the peripheral region 101b, and a length of a first edge of the first rectangular through hole 104b1 is less than a length of a second edge. The second rectangular through hole 104b2 is disposed in the second region 101b2 extending along the second direction Y in the peripheral region 101b, and a length of a first edge of the second rectangular through hole 104b2 is greater than a length of a second edge.

Relative to the circular through hole, the slit only has a light-receiving limit in the target direction. For example, the first rectangular through hole 104b1 disposed in the first region 101b1 only has the light-receiving limit in the first direction X (the target direction is the first direction X). The second rectangular through hole 104b2 disposed in the second region 101b2 only has the light-receiving limit in the second direction Y (the target direction is the second direction Y).

Because the slit only has a light-receiving limit in the target direction, but does not have a light-receiving limit in another direction perpendicular to the target direction, relative to the circular through-hole, the slit transmits more optical signals. In this way, the photoelectric sensor assembly 103 may receive strong optical signals, and requirements on capabilities of the photoelectric sensor assembly 103 to receive the optical signals are lowered.

Figure 14:
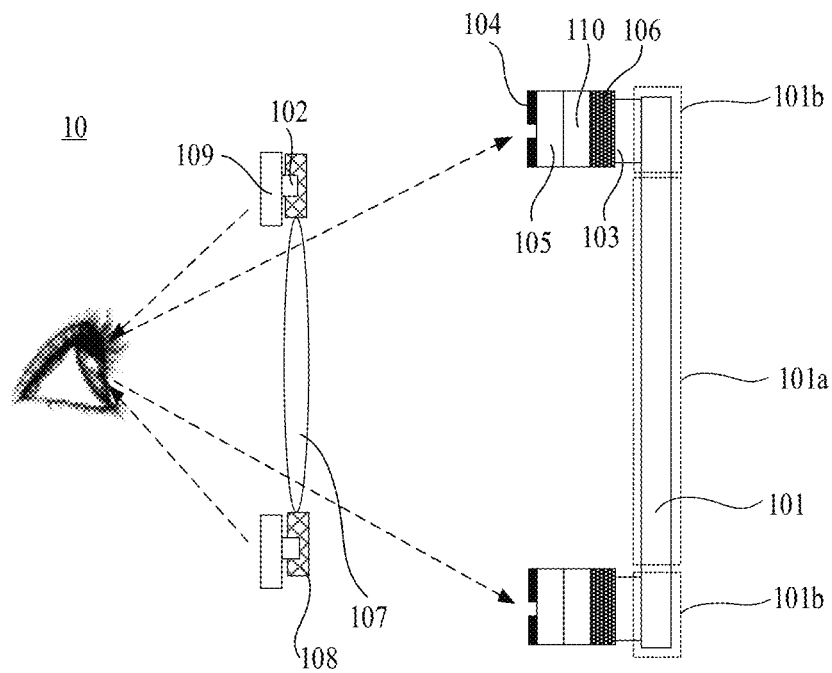
FIG. 14 is a schematic structural diagram of still another wearable display device according to an embodiment of the present disclosure.

FIG. 14 is a schematic structural diagram of still another wearable display device according to an embodiment of the present disclosure. As illustrated in FIG. 14, the wearable display device 10 may further include a light transmitting layer 105. The light transmitting layer 105 may be disposed between the plurality of photoelectric sensor assemblies 103 and the optical structure 104.

By disposing the light transmitting layer 105 between the photoelectric sensor assembly 103 and the optical structure 104, a distance between the photoelectric sensor assembly 103 and the optical structure 104 may be enlarged, and the region of the eyes of the user corresponding to the optical signal that may be received by each of the photoelectric sensor assemblies 103 may be reduced. In this way, an accuracy of the optical signal received by the photoelectric sensor assembly 103 is increased, thereby increasing the accuracy of the determined gaze position.

As illustrated in FIG. 14, the wearable display device 10 may further include a filter 106. The filter 106 may be disposed on a side, distal from the display panel 101, of the plurality of photoelectric sensor assemblies 103, and an orthographic projection of the filter 106 on the display panel 101 covers orthographic projections of the plurality of photoelectric sensor assemblies 103 on the display panel 101. The filters 106 may be configured to transmit the infrared light and absorb visible light.

By disposing the filter 106 on the side, distal from the display panel 101, of the photoelectric sensor assembly 103 to filter out the visible light, the light signal received by photoelectric sensor assembly 103 may be prevented from being affected by light emitted by the display panel 101, thereby ensuring the accuracy of the determined gaze position.

As illustrated in FIGS. 1, 2, and 14, the wearable display device 10 may further include a lens 107 and a lens frame 108. The lens 107 may be disposed on a display side of the display panel 101 through which a user may view the images displayed by the display panel 101. The lens frame 108 may be disposed on an edge of the lens 107 for supporting and securing the lens 107.

As illustrated in FIGS. 1, 12, and 14, the plurality of light-emitting elements 102 may be disposed on a side, distal from the display panel 101, of the lens frame 108, and connected to the lens frame 108. That is, the plurality of light-emitting elements 102 may be fixed to the side, distal from the display panel 101, of the lens frame 108.

Optionally, the plurality of light-emitting elements 102 may be arranged evenly on the side, distal from the display panel 101, of the lens frame 108. In this way, a uniformity of the optical signals received by each region of the eyes of the user is improved, and thus the accuracy of the determined gaze position is ensured.

In the embodiments of the present disclosure, as illustrated in FIG. 14, the wearable display device 10 may further include: a first polarizer layer 109 and a second polarizer layer 110. The first polarizer layer 109 may be disposed on a light-exiting side of the light-emitting element 102, and the second polarizer layer 110 may be disposed on the side, distal from the display panel 101, of the plurality of photoelectric sensor assemblies 103. A polarization direction of the second polarizer layer 110 may be intersected with a polarization direction of the first polarizer layer 109.

The light emitted by the light-emitting element 102 may first pass through the first polarizer layer 109, and then be irradiated to the eyes of the user. Moreover, light reflected via the eyes of the user may first pass through the second polarizer layer 110, and then be irradiated to the photoelectric sensor assembly 103.

The light emitted by the light-emitting element 102 is converted into polarized light upon passing through the first polarizer layer 109. The polarized light is irradiated to the eyes of the user, and specular and diffuse reflection occurs at the eyes of the user. The light specularly reflected and diffusely reflected via the eyes of the user may be transmitted to the second polarizer layer 110.

Because the specularly reflected light is the polarized light which is reflected and then emitted along a parallel direction, and the polarization direction of the second polarizer layer 110 is intersected with the polarization direction of the first polarizer layer 109, the light specularly reflected via the eyes of the user may not be transmitted through the second polarizer layer 110. Because the diffusely reflected light is the polarized light which is reflected and then emitted along each direction, the light diffusely reflected via the eyes of the user may be transmitted through the second polarizer layer 110 even in the case that the polarization direction of the second polarizer layer 110 is intersected with the polarization direction of the first polarizer layer 109.

Accordingly, the photoelectric sensor assembly 103 may not receive the light which is specularly reflected via the eyes of the user, but may only receive the light which is diffusely reflected via the eyes of the user. That is, in the embodiments of the present disclosure, the optical signal, reflected via the eyes of the user, of the light-emitting element 102 received by the photoelectric sensor assembly 103 is the optical signal, diffusely reflected via the eyes of the user, of the light-emitting element 102.

The photoelectric sensor assembly 103 converts the diffusely reflected optical signal of the light-emitting element 102 into the electric signal, and the wearable display device 10 determines the gaze position of the eyes of the user on the display panel 101 based on the electric signal. Because the solutions according to the embodiments of the present disclosure suppress a specular reflection, by the eyes of the user, of the light emitted by the light-emitting element 102, it is possible to avoid an effect of the specularly reflected light on determining the gaze position, thereby ensuring the accuracy of the determined gaze position.

Optionally, the polarization direction of the second polarizer layer 110 is perpendicular to the polarization direction of the first polarizer layer 109. By configuring the polarization direction of the second polarizer layer 110 to be perpendicular to the polarization direction of the first polarizer layer 109, the light, specularly reflected via the eyes of the user, of the first light-emitting element 102 may not be transmitted through the second polarizer layer 110. In this way, the photoelectric sensor assembly 103 is prevented from receiving the specularly reflected light, and thus a determination of the gaze position is not affected.

In summary, the embodiments of the present disclosure provide a wearable display device. Because the wearable display device has a high efficiency in processing the electric signal transmitted by each of the photoelectric sensor assemblies, the wearable display device may quickly determine the gaze position of the eyes of the user on the display panel based on the electric signal transmitted by each of photoelectric sensor assemblies. In this way, the efficiency of displaying the images by the display panel is improved, and thus a higher refresh rate of the display panel is achieved.

Figure 15:
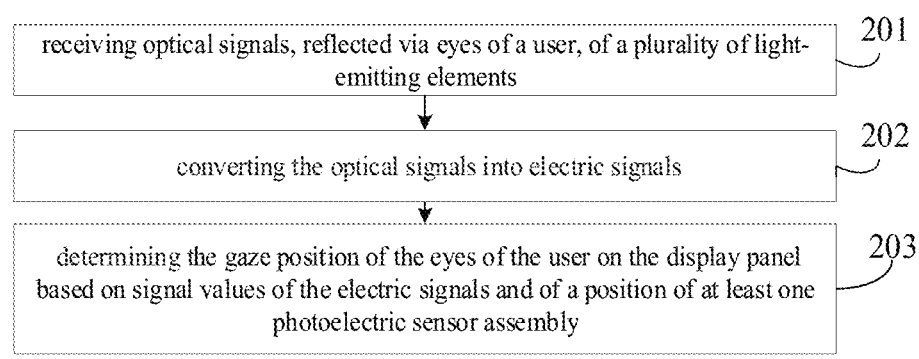
FIG. 15 is a flowchart of a method for determining gaze positions according to an embodiment of the present disclosure.

FIG. 15 is a flowchart of a method for determining gaze positions according to an embodiment of the present disclosure. The method is applicable to the wearable display device 10 according to the embodiments described above. As illustrated in FIG. 15, the method may include the following steps.

In step 201, optical signals, reflected via eyes of a user, of a plurality of light-emitting elements are received.

In the embodiments of the present disclosure, the wearable display device 10 includes a display panel 101, a plurality of light-emitting elements 102, and a plurality of photoelectric sensor assemblies 103. Light emitted by the plurality of light-emitting elements 102 is configured to be irradiated to the eyes of the user. The display panel 101 includes a display region 101a and a peripheral region 101b surrounding the display region 101a. The plurality of photoelectric sensor assemblies 103 may be disposed in the peripheral region 101b, each of the photoelectric sensor assemblies 103 being configured to receive the optical signals, reflected via the eyes of the user, of the plurality of light-emitting elements 102.

In step 202, the optical signals are converted into electric signals.

In the embodiments of the present disclosure, in the case that each of the photoelectric sensor assemblies 103 receives the optical signal, reflected via the eyes of the user, the received optical signal may be converted into the electric signal.

In step 203, the gaze position of the eyes of the user on the display panel is determined based on signal values of the electric signals and of a position of at least one photoelectric sensor assembly.

In the embodiments of the present disclosure, the wearable display device 10 further includes a processor connected to each of the photoelectric sensor assemblies 103 and capable of receiving electric signal transmitted by each of the photoelectric sensor assemblies 103. In the case that the processor receives the electric signal transmitted by each of the photoelectric sensor assemblies 103, the gaze position of the eyes of the user on the display panel 101 may be determined based on a signal value of the electric signal transmitted by each of the photoelectric sensor assemblies 103 and the position of the at least one photoelectric sensor assembly 103.

In the embodiments of the present disclosure, a position of each of the photoelectric sensor assemblies 103 may be pre-stored in the processor. Because different regions of human eyes are different in reflectivity to light (e.g., infrared light), the optical signals, reflected via different regions of the human eyes, received by the photoelectric sensor assemblies 103 are different. Signal values of electric signals, converted by the photoelectric sensor assembly 103 based on different optical signals, are different. In this way, the processor may determine the gaze position of the eyes of the user on display panel 101 based on the signal values of the electric signals and the position of the photoelectric sensor assembly 103.

In general, an amount of data of the electric signals is small, and an amount of data of images is large. Therefore, an efficiency of the processor in processing the electric signals is higher than an efficiency of the processor in processing the images. In the embodiments of the present disclosure, the processor has a high efficiency in processing the electric signal transmitted by each of the photoelectric sensor assemblies 103, such that the gaze position of the eyes of the user on display panel 101 is quickly determined. In this way, an efficiency of displaying images by the display panel 101 is improved, and thus a higher refresh rate of the display panel is achieved.

In summary, the embodiments of the present disclosure provide a wearable display device. The wearable display device has a high efficiency in processing the electric signal transmitted by each of the photoelectric sensor assemblies, such that the wearable display device may quickly determine the gaze position of the eyes of the user on the display panel based on the electric signal transmitted by each of the photoelectric sensor assemblies. In this way, the efficiency of displaying the images by the display panel is improved, and thus a higher refresh rate of the display panel is achieved.

Figure 16:
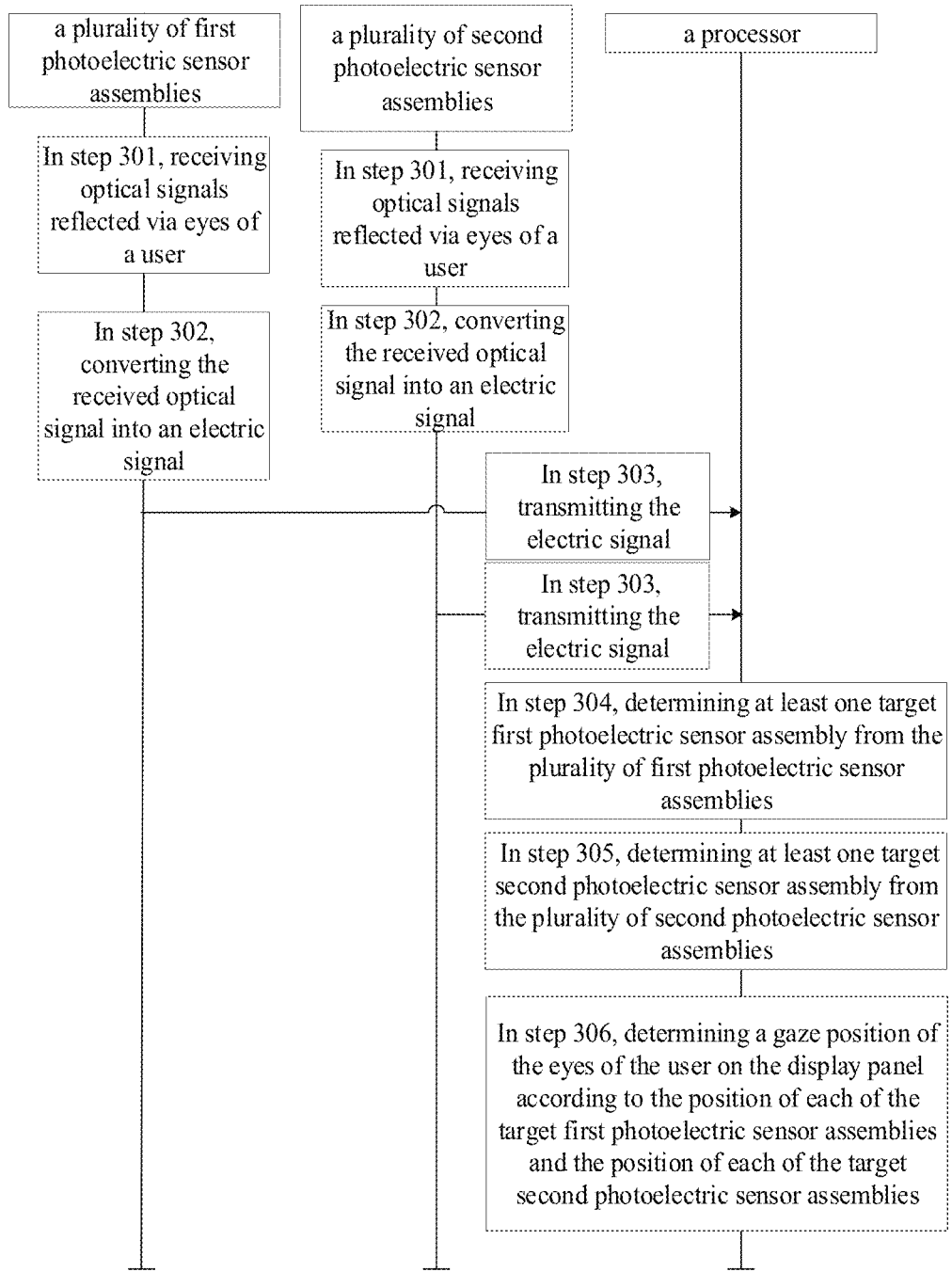
FIG. 16 is a flowchart of another method for determining gaze positions according to an embodiment of the present disclosure.

FIG. 16 is a flowchart of another method for determining gaze positions according to an embodiment of the present disclosure. The method is applicable to the wearable display device 10 according to the embodiments described above. As illustrated in FIG. 16, the method may include the following steps.

In step 301, a plurality of first photoelectric sensor assemblies, and a plurality of second photoelectric sensor assemblies receive optical signals reflected via eyes of a user.

In the embodiments of the present disclosure, the wearable display device 10 includes a display panel 101 and a plurality of photoelectric sensor assemblies 103. The display panel 101 includes a display region 101a and a peripheral region 101b surrounding the display region 101a. A user is typically disposed on a display side of the display panel 101 to view images displayed in the display panel 101. Moreover, the plurality of photoelectric sensor assemblies 103 may be disposed on the display side of the display panel 101 and disposed in the peripheral region 101b.

The display side of the display panel 101 is provided with a plurality of light-emitting elements 102. Light emitted by the plurality of light-emitting elements 102 may be irradiated to the eyes of the user, and the eyes of the user may reflect the light emitted by the plurality of light-emitting elements 102. Moreover, the light emitted by the plurality of light-emitting elements 102 may be irradiated to the plurality of photoelectric sensor assemblies 103 upon being reflected via the eyes of the user. In this way, the plurality of photoelectric sensor assemblies 103 may receive the optical signals reflected via the eyes of the user.

Optionally, the plurality of photoelectric sensor assemblies 103 include a plurality of first photoelectric sensor assemblies 103a arranged along a first direction X and a plurality of second photoelectric sensor assemblies 103b arranged along a second direction Y. Either the plurality of first photoelectric sensor assemblies 103a or the plurality of second photoelectric sensor assemblies 103b are capable of receiving the optical signals reflected via the eyes of the user.

In step 302, each photoelectric sensor assembly of the plurality of first photoelectric sensor assemblies and the plurality of second photoelectric sensor assemblies converts the received optical signal into an electric signal.

In the embodiments of the present disclosure, in the case that the plurality of first photoelectric sensor assemblies 103a and the plurality of second photoelectric sensor assemblies 103b receive the optical signals, each of the photoelectric sensor assemblies 103 may convert the received optical signal into the electric signal.

Moreover, a signal value of the electric signal converted by the photoelectric sensor assembly 103 is positively correlated with a signal value of the optical signal received by the photoelectric sensor assembly 103. That is, the larger the signal value of the optical signal received by the photoelectric sensor assembly 103, the larger the signal value of the electric signal converted, by the photoelectric sensor assembly 103, from the optical signal received; and the smaller the signal value of the optical signal received by the photoelectric sensor assembly 103, the smaller the signal value of the electric signal converted, by the photoelectric sensor assembly 103, from the optical signal received. The signal value of the optical signal may indicate an intensity of the light.

In step 303, each of the photoelectric sensor assemblies transmits the electric signal to a processor.

In the embodiments of the present disclosure, the processor in the wearable display device 10 may be connected to each of the photoelectric sensor assemblies 103. Each of the photoelectric sensor assemblies 103 may transmit the electric signal to the processor.

In step 304, the processor determines at least one target first photoelectric sensor assembly from the plurality of first photoelectric sensor assemblies.

In the embodiments of the present disclosure, in the case that the processor receives electric signals transmitted by the plurality of first photoelectric sensor assemblies 103a, at least one target first photoelectric sensor assembly may be determined from the plurality of first photoelectric sensor assemblies 103a. Furthermore, the processor may also determine a position of each of the at least one target first photoelectric sensor assembly, e.g., determine coordinate values of each of the at least one target first photoelectric sensor assembly.

A signal value of an electric signal transmitted, by the target first photoelectric sensor assembly, to the processor is less than or equal to a first threshold. The first threshold may be a fixed value pre-stored in the processor. Alternatively, the first threshold may be determined, by the processor, based on signal values of the received electric signals of the plurality of first photoelectric sensor assemblies 103a.

Exemplarily, the processor may sort the signal values of N electric signals transmitted by N first photoelectric sensor assemblies 103a in an ascending order, and determine the signal value in the $n^{th}$ position as the first threshold. N is an integer greater than 1 and n is an integer greater than 1 and less than N/2. Optionally, the processor may determine a minimum of the signal values of the received electric signals of the plurality of first photoelectric sensor assemblies 103a as the first threshold In the case that the first threshold value is the minimum of the signal values of the electric signals transmitted by the plurality of the first photoelectric sensor assemblies 103a, the processor may determine one target first photoelectric sensor assembly from the plurality of first photoelectric sensor assemblies 103a. In this way, the processor may determine first coordinate values of the target first photoelectric sensor assembly transmitting an electric signal with the minimum signal value in the plurality of first photoelectric sensor assemblies 103a.

Optionally, the first coordinate values may be expressed in terms of (a first abscissa value, a first ordinate value). The first abscissa value may be a coordinate value, in the first direction X, of the target first photoelectric sensor assembly, and the first ordinate value may be a coordinate value, in the second direction Y, of the target first photoelectric sensor assembly. Because the plurality of first photoelectric sensor assemblies 103a are arranged along the first direction X, the coordinate value of each of the first photoelectric sensor assemblies 103a in the second direction Y may be 0. That is, the first ordinate value of the target first photoelectric sensor assembly may be 0.

Figure 17:
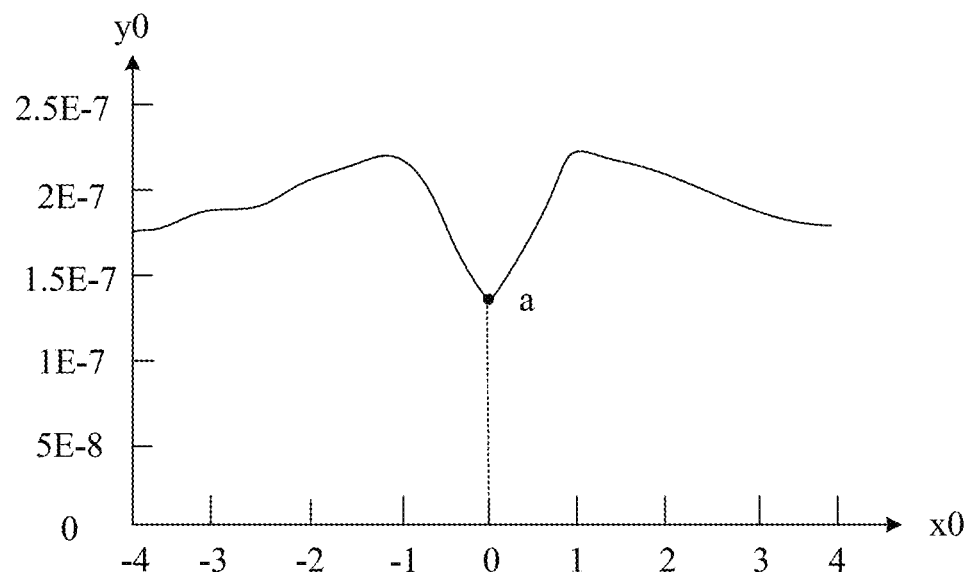
FIG. 17 is a graph of an optical signal of a first photoelectric sensor assembly according to an embodiment of the present disclosure.
Figure 18:
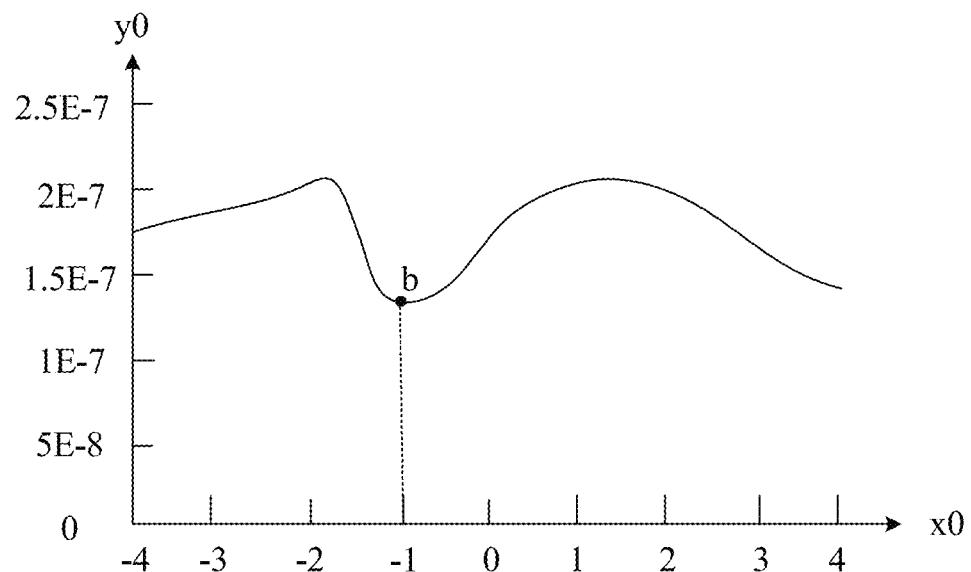
FIG. 18 is a graph of an optical signal of another first photoelectric sensor assembly according to an embodiment of the present disclosure.

FIG. 17 is a graph of an optical signal of a first photoelectric sensor assembly according to an embodiment of the present disclosure. FIG. 18 is a graph of an optical signal of another first photoelectric sensor assembly according to an embodiment of the present disclosure. As illustrated in FIG. 17 and FIG. 18, the first photoelectric sensor assemblies 103a are respectively disposed at positions: −4, −3, −2, −1, 0, 1, 2, 3, and 4, from left to right. In FIG. 17 and FIG. 18, an abscissa indicates the position of each of the first photoelectric sensor assemblies 103a, and an ordinate indicates the signal value of the electric signal. E-k in FIG. 17 and FIG. 18 indicates 10 to the power of minus k, e.g., 5E-8 indicates 5 multiplied by 10 to the power of minus 8.

Figure 19:
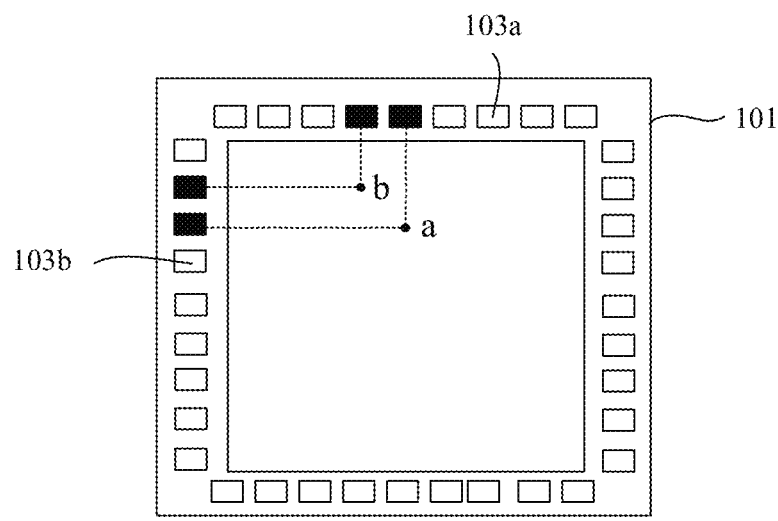
FIG. 19 is a schematic diagram of still another display panel and a photoelectric sensor assembly according to an embodiment of the present disclosure.

Assuming that the processor determines one target first photoelectric sensor assembly from the plurality of first photoelectric sensor assemblies 103a, then in FIG. 17, a signal value of an electric signal transmitted by a first photoelectric sensor assembly 103a, which is disposed at a position 0, is minimum. In this way, the first photoelectric sensor assembly 103a, which is disposed at the position 0, may be determined as the target first photoelectric sensor assembly. Alternatively, in FIG. 18, a signal value of an electric signal transmitted by a first photoelectric sensor assembly 103a, which is disposed at a position −0.1, is minimum. In this way, the first photoelectric sensor assembly 103a, which is disposed at the position −1, may be determined as the target first photoelectric sensor assembly. As illustrated in FIG. 19, totally nine first photoelectric sensor assemblies 103a are disposed in a first region 101b1 of the peripheral region 101b of the display panel 101.

In step 305, the processor determines at least one target second photoelectric sensor assembly from the plurality of second photoelectric sensor assemblies.

In the embodiments of the present disclosure, in the case that the processor receives electric signals transmitted by the plurality of second photoelectric sensor assemblies 103b, at least one target second photoelectric sensor assembly may be determined from the plurality of second photoelectric sensor assembly 103b. Furthermore, the processor may also determine a position of each of at least one target second photoelectric sensor assembly, e.g., determine coordinate values of each of the at least one target second photoelectric sensor assembly.

A signal value of an electric signal transmitted, by the target second photoelectric sensor assembly, to the processor is less than or equal to a second threshold value. The second threshold may be a fixed value pre-stored in the processor. Alternatively, the second threshold may be determined, by the processor, based on signal values of the received electric signals of the plurality of second photoelectric sensor assemblies 103b.

Exemplarily, the processor may sort signal values of M electric signals transmitted by M second photoelectric sensor assemblies 103b in the ascending order, and determine the signal value in the $m^{th}$ position as the second threshold. M is an integer greater than 1 and n is an integer greater than 1 and less than M/2. Optionally, the processor may determine a minimum of the signal values of the received electric signals of the plurality of second photoelectric sensor assemblies 104b as the second threshold.

In the case that the second threshold value is the minimum of the signal values of the electric signals transmitted by the plurality of the second photoelectric sensor assemblies 103b, the processor may determine one target second photoelectric sensor assembly from the plurality of second photoelectric sensor assemblies 103b. In this way, the processor may determine second coordinate values of the target second photoelectric sensor assembly transmitting an electric signal with the minimum signal value in the plurality of second photoelectric sensor assemblies 103b.

Optionally, the second coordinate values may be expressed in terms of (a second abscissa value and a second ordinate value). The second abscissa value may be a coordinate value, in the first direction X, of the target second photoelectric sensor assembly, and the second ordinate value may be a coordinate value, in the second direction Y, of the target second photoelectric sensor assembly. Because the plurality of second photoelectric sensor assemblies 103b are arranged along the second direction Y, the coordinate value of each of the second photoelectric sensor assemblies 103b in the first direction X may be 0. That is, the second abscissa value of the target second photoelectric sensor assembly may be 0.

Figure 20:
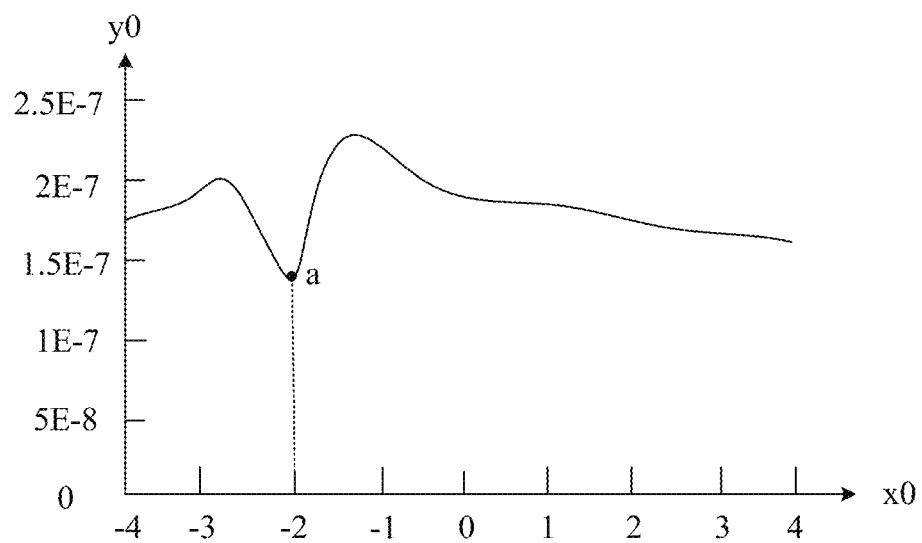
FIG. 20 is a graph of an optical signal of a second photoelectric sensor assembly according to an embodiment of the present disclosure.
Figure 21:
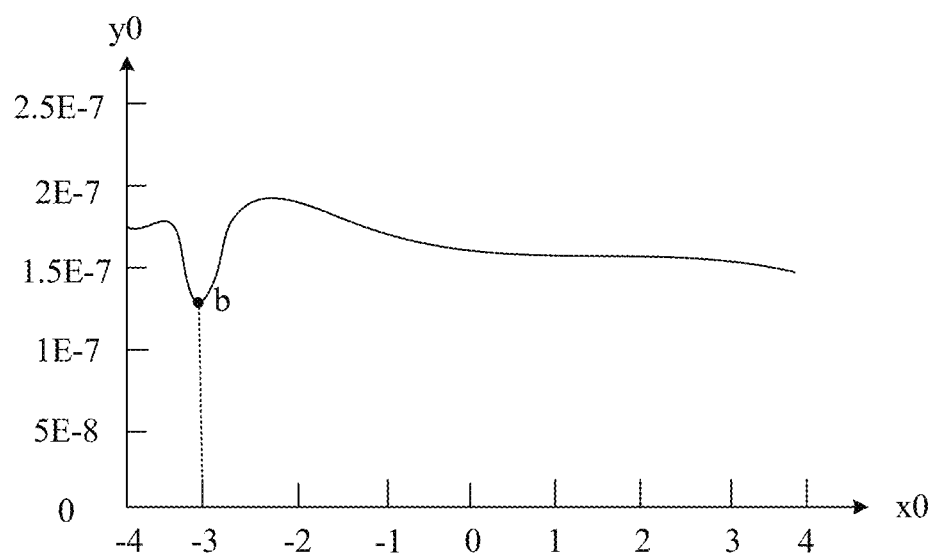
FIG. 21 is a graph of an optical signal of another second photoelectric sensor assembly according to an embodiment of the present disclosure.

FIG. 20 is a graph of an optical signal of a second photoelectric sensor assembly according to an embodiment of the present disclosure. FIG. 21 is a graph of an optical signal of another second photoelectric sensor assembly according to an embodiment of the present disclosure. As illustrated in FIG. 20 and FIG. 21, the second photoelectric sensor assemblies 103b are respectively disposed at positions: −4, −3, −2, −1, 0, 1, 2, 3, and 4, from top to bottom. In FIG. 20 and FIG. 21, an abscissa indicates the position of each of the second photoelectric sensor assemblies 103b, and an ordinate indicates the signal value of the electric signal. E-k in FIG. 20 and FIG. 21 indicates 10 to the power of minus k, e.g., 5E-8 indicates 5 multiplied by 10 to the power of minus 8.

Assuming that the processor determines one target second photoelectric sensor assembly, from the plurality of second photoelectric sensor assemblies 103b, then in MG. 20, a signal value of an electric signal transmitted by a second photoelectric sensor assembly 103b, which is disposed at a position −2, is minimum. In this way, the second photoelectric sensor assembly 103b, which is disposed at the position −2, may be determined as the target second photoelectric sensor assembly. Alternatively, in FIG. 21, a signal value of an electric signal transmitted by a second photoelectric sensor assembly 103b, which is disposed at a position −3, is minimum. In this way, the second photoelectric sensor assembly 103b, which is disposed at the position −3, may be determined as the target second photoelectric sensor assembly. As illustrated in FIG. 19, 9 second photoelectric sensor assemblies 103b are disposed in a second region 101b2 of the peripheral region 101b of the display panel 101.

It should be noted that, the number of first photoelectric sensor assemblies 103a disposed in the first region 101b1 of the peripheral region 101b of the display panel 101 may be equal to the number of second photoelectric sensor assemblies 103b disposed in the second region 101b2. The number of first photoelectric sensor assemblies 103a disposed in the first region 101b1 may not be equal to the number of second photoelectric sensor assemblies 103b disposed in the second region 101b2. For example, in general, a length, along the first direction X, of the display panel 101 is greater than a length along the second direction Y, and thus the number of first photoelectric sensor assemblies 103a disposed in the first region 101b1 may be greater than the number of second photoelectric sensor assemblies 103b disposed in the second region 101b2.

In step 306, the processor determines a gaze position of the eyes of the user on the display panel according to the position of each of the target first photoelectric sensor assemblies and the position of each of the target second photoelectric sensor assemblies.

In the embodiments of the present disclosure, in the case that the processor determines the position of each of the target first photoelectric sensor assemblies and the position of each of the target second photoelectric sensor assemblies, the gaze position of the eyes of the user on the display panel 101 may be determined according to the position of each of the target first photoelectric sensor assemblies and the position of each of the target second photoelectric sensor assemblies.

In some embodiments, assuming that the processor determines a plurality of target first photoelectric sensor assemblies, then the processor may determine first coordinate values of each target first photoelectric sensor assembly in the plurality of target first photoelectric sensor assemblies. The first coordinate values of each target first photoelectric sensor assembly may be expressed in terms of (a first abscissa value and a first ordinate value). Afterwards, the processor may determine a first abscissa average value of the first abscissa values of the plurality of target first photoelectric sensor assemblies and a first ordinate average value of the first ordinate values of the plurality of target first photoelectric sensor assemblies.

Because the first ordinate value of each target first photoelectric sensor assembly is 0, the first ordinate average value of the first ordinate values of the plurality of target first photoelectric sensor assemblies is also 0.

Accordingly, assuming that the processor determines a plurality of target second photoelectric sensor assemblies, then the processor may determine second coordinate values of each target second photoelectric sensor assembly in the plurality of target second photoelectric sensor assemblies. The second coordinate values of each target second photoelectric sensor assembly may be expressed in terms of (a second abscissa value, a second ordinate value). Afterwards, the processor may determine a second abscissa average value of the second abscissa values of the plurality of target second photoelectric sensor assemblies, and a second ordinate average value of the second ordinate values of the plurality of target second photoelectric sensor assemblies.

Because the second abscissa value of each target second photoelectric sensor assembly is 0, the second abscissa average value of the second abscissa values of the plurality of target second photoelectric sensor assemblies is also 0.

Afterwards, the processor may determine the gaze position of the eyes of the user on the display panel 101 based on the first abscissa average value and the second ordinate average value. For example, the gaze position may be expressed by coordinates of the gaze position (the first abscissa average value, the second ordinate average value).

In some embodiments, assuming that the processor determines one target first photoelectric sensor assembly, then the processor may determine first coordinate values of the target first photoelectric sensor assembly. The first coordinate values of the target first photoelectric sensor assembly may be expressed in terms of (a first abscissa value and a first ordinate value).

Accordingly, assuming that the processor determines one target second photoelectric sensor assembly, then the processor may determine second coordinate values of the target second photoelectric sensor assembly. The second coordinate values of the target second photoelectric sensor assembly may be expressed in terms of (a second abscissa value and a second ordinate value).

Afterwards, the processor may determine the gaze position of the eyes of the user on the display panel 101 based on the first abscissa value and the second ordinate value. For example, the gaze position may be expressed by coordinates of the gaze point (the first abscissa value and the second ordinate value).

Exemplarily, referring to FIG. 17 and FIG. 20 together, a gaze position a may be expressed by coordinates of the gaze point (0, −2). Alternatively, a gaze position b may be expressed by coordinates of the gaze point (−1, −3).

It is noted that, upon determining the gaze position, the processor may render an image to be displayed in the display panel 101 based on the gaze position and transmit the rendered image to be displayed to the drive circuit of the display panel 101, such that the drive circuit drives the display panel 101 to display the rendered image to be displayed. Alternatively, the processor may transmit the gaze position to another processor upon determining the gaze position. The another processor renders the image to be displayed in the display panel 101 based on the gaze position and transmits the rendered image to be displayed to the drive circuit of the display panel 101, such that the drive circuit drives the display panel 101 to display the rendered image to be displayed.

The rendering of the to-be-displayed image may be to partially render a region where the gaze point is disposed in the image to be displayed. The region of the gaze point refers to a target region centered on the gaze position. A shape of the target region may be circular, rectangular, or the like, and a size of the target region may be a pre-stored size in the processor.

It should be noted that a sequence of steps of the method for determining the gaze positions according to the embodiments of the present disclosure may be adjusted appropriately, and the steps may be scaled accordingly. For example, step 305 and step 304 may be performed concurrently, or step 305 may be performed before step 304. Any variations within the scope of the technology disclosed in this disclosure made by persons of ordinary skill in the art fall within the protection scope of the present disclosure, and are therefore not repeated herein.

In summary, the embodiments of the present disclosure provide a method for determining the gaze positions. The wearable display device has a high efficiency in processing the electric signal transmitted by each of the photoelectric sensor assemblies, such that the gaze position of the eyes of the user on display panel is quickly determined based on the electric signal transmitted by each of the photoelectric sensor assemblies. In this way, an efficiency of displaying images by the display panel is improved, and thus a higher refresh rate of the display panel is achieved.

An embodiment of the present disclosure further provides a non-transitory computer-readable storage medium. The non-transitory computer-readable storage medium stores one or more instructions therein, wherein the one or more instructions, when loaded and executed by a wearable display device, cause the wearable display device to perform the method as described above.

An embodiment of the present disclosure further provides a computer program product storing one or more instructions therein, wherein the one or more instructions, when loaded and executed by a computer, cause the computer to perform the method as described above.

Described above are merely exemplary embodiments of the present disclosure and are not intended to limit the present disclosure. Within the spirit and principles of the present disclosure, any modifications, equivalent substitutions, improvements, and the like fall within the protection scope of the present disclosure.

What is claimed is:

1. A wearable display device, comprising:
   a display panel, comprising a display region and a peripheral region surrounding the display region;
   a plurality of light-emitting elements, configured to emit light to be irradiated to eyes of a user;
   a plurality of photoelectric sensor assemblies, disposed in the peripheral region, wherein each of the photoelectric sensor assemblies is configured to receive optical signals, reflected via the eyes of the user, of the plurality of light-emitting elements, and convert the optical signals into electric signals, the electric signals being configured to determine a gaze position of the eyes of the user on the display panel; and
   an optical structure, disposed on a side, distal from the display panel, of the photoelectric sensor assembly, an orthographic projection of the optical structure on the display panel being within the peripheral region, and the optical structure comprises a light shielding region and a plurality of light transmitting regions, wherein the plurality of light transmitting regions are in one-to-one correspondence to the plurality of photoelectric sensor assemblies, each of the light transmitting regions at least being configured to transmit the optical signal to a corresponding photoelectric sensor assembly.

2. The wearable display device according to claim 1, wherein the peripheral region comprises: a first region extending along a first direction and a second region extending along a second direction, the first direction being intersected with the second direction; and the plurality of photoelectric sensor assemblies comprise: a plurality of first photoelectric sensor assemblies and a plurality of second photoelectric sensor assemblies;

wherein the plurality of first photoelectric sensor assemblies are disposed in the first region and arranged along the first direction, and the plurality of second photoelectric sensor assemblies are disposed in the second region and arranged along the second direction.

3. The wearable display device according to claim 2, wherein the optical structure comprises: a first branch structure extending along the first direction and a second branch structure extending along the second direction; wherein the first branch structure is provided with a plurality of first light transmitting regions in one-to-one correspondence to the plurality of first photoelectric sensor assemblies, an orthographic projection of each of the first light transmitting regions on the display panel being at least overlapped with an orthographic projection of a corresponding first photoelectric sensor assembly on the display panel; and the second branch structure is provided with a plurality of second light transmitting regions in one-to-one correspondence to the plurality of second photoelectric sensor assemblies, an orthographic projection of each of the second light transmitting regions on the display panel being at least overlapped with an orthographic projection of a corresponding second photoelectric sensor assembly on the display panel.

4. The wearable display device according to claim 2, wherein the first direction is perpendicular to the second direction; and the peripheral region comprises: two first regions and two second regions;

wherein the two first regions are arranged along the second direction and respectively disposed on two sides of the display region, and the two second regions are arranged along the first direction and respectively disposed on the two sides of the display region.

5. The wearable display device according to claim 4, wherein the optical structure comprises: two first branch structures in one-to-one correspondence to the two first regions, and two second branch structures in one-to-one correspondence to the two second regions.

6. The wearable display device according to claim 2, wherein a detection width, along a target direction, of the photoelectric sensor assembly is positively correlated with a width, along the target direction, of the light transmitting region; and the detection width, along the target direction, of the photoelectric sensor assembly is positively correlated with a width, along the target direction, of the photoelectric sensor assembly;

wherein the target direction is the first direction or the second direction.

7. The wearable display device according to claim 6, wherein the detection width h, along the target direction, of the photoelectric sensor assembly satisfies:

$$h = 2u * \tan(\arcsin(\frac{n_1}{n_2} * \sin(\arctan(\frac{p+s}{2v})))) + s$$

wherein u represents a distance between the eyes of the user and the optical structure, v represents a distance between the optical structure and the plurality of photoelectric sensor assemblies, n1 represents a refractive index of a medium between the optical structure and the plurality of photoelectric sensor assemblies, n2 represents a refractive index of a medium between the eyes of the user and the optical structure, p represents the width, along the target direction, of the photoelectric sensor assembly, and s represents the width, along the target direction, of the light transmitting region.

8. The wearable display device according to claim 1, wherein each of the light transmitting regions is a circular through hole; or each of the light transmitting regions is a rectangular through hole.

9. The wearable display device according to claim 8, wherein a first edge of each of the rectangular through holes is parallel to the first direction, and a second edge is parallel to the second direction; and the rectangular through holes comprise a plurality of first rectangular through holes and a plurality of second rectangular through holes;

wherein the first rectangular through hole is disposed in the first region extending along the first direction in the peripheral region, a length of a first edge of the first rectangular through hole being less than a length of a second edge;

wherein the second rectangular through hole is disposed in the second region extending along the second direction in the peripheral region, a length of a first edge of the second rectangular through hole being greater than a length of a second edge.

10. The wearable display device according to claim 1, further comprising: a light transmitting layer;

wherein the light transmitting layer is disposed between the plurality of photoelectric sensor assemblies and the optical structure.

11. The wearable display device according to claim 1, further comprising a filter;

wherein the filter is disposed on a side, distal from the display panel, of the plurality of photoelectric sensor assemblies, an orthographic projection of the filter on the display panel being overlapped with orthographic projections of the plurality of photoelectric sensor assemblies on the display panel; wherein the filter is configured to transmit infrared light and absorb visible light.

12. The wearable display device according to claim 1, further comprising: a lens and a lens frame;

wherein the lens is disposed on a display side of the display panel, and the lens frame is disposed on an edge of the lens.

13. The wearable display device according to claim 12, wherein the plurality of light-emitting elements are disposed on a side, distal from the display panel, of the lens frame, and connected to the lens frame.

14. The wearable display device according to claim 13, wherein the plurality of light-emitting elements are arranged evenly on the side, distal from the display panel, of the lens frame.

15. The wearable display device according to claim 1, wherein the light-emitting element is an infrared light-emitting diode.

16. The wearable display device according to claim 1, further comprising: a first polarizer layer and a second polarizer layer;
wherein the first polarizer layer is disposed on a light-exiting side of the light-emitting element, and the second polarizer layer is disposed on the side, distal from the display panel, of the plurality of photoelectric sensor assemblies, a polarization direction of the second polarizer layer being intersected with a polarization direction of the first polarizer layer.

17. The wearable display device according to claim 16, wherein the polarization direction of the second polarizer layer is perpendicular to the polarization direction of the first polarizer layer.

18. A method for determining gaze positions, applicable to a wearable display device, wherein the wearable display device comprises:
a display panel, comprising a display region and a peripheral region surrounding the display region;
a plurality of light-emitting elements, configured to emit light to be irradiated to eyes of a user;
a plurality of photoelectric sensor assemblies, disposed in the peripheral region, wherein each of the photoelectric sensor assemblies is configured to receive optical signals, reflected via the eyes of the user, of the plurality of light-emitting elements, and convert the optical signals into electric signals, the electric signals being configured to determine a gaze position of the eyes of the user on the display panel; and
an optical structure, disposed on a side, distal from the display panel, of the photoelectric sensor assembly, an orthographic projection of the optical structure on the display panel being within the peripheral region, and the optical structure comprises a light shielding region and a plurality of light transmitting regions, wherein the plurality of light transmitting regions are in one-to-one correspondence to the plurality of photoelectric sensor assemblies, each of the light transmitting regions at least being configured to transmit the optical signal to a corresponding photoelectric sensor assembly;
and the method comprises:
receiving optical signals, reflected via eyes of a user, of a plurality of light-emitting elements;
converting the optical signals into electric signals; and
determining a gaze position of the eyes of the user on a display panel based on signal values of the electric signals and a position of at least one of the photoelectric sensor assemblies.

19. The method according to claim 18, wherein determining the gaze position of the eyes of the user on the display panel based on the signal values of the electric signals and the position of the at least one of the photoelectric sensor assemblies comprises:
determining at least one target first photoelectric sensor assembly from a plurality of first photoelectric sensor assemblies arranged along a first direction;
determining at least one target second photoelectric sensor assembly from a plurality of second photoelectric sensor assemblies arranged along a second direction; and
determining the gaze position of the eyes of the user on the display panel based on a position of each of the at least one target first photoelectric sensor assembly and a position of each of the at least one target second photoelectric sensor assembly;
wherein a signal value of an electric signal transmitted by the target first photoelectric sensor assembly is less than or equal to a first threshold, and a signal value of an electric signal transmitted by the target second photoelectric sensor assembly is less than or equal to a second threshold.

* * * * *